(12) United States Patent
Alexander, IV et al.

(10) Patent No.: US 12,243,445 B2
(45) Date of Patent: Mar. 4, 2025

(54) INDIVIDUAL VIEWING IN A SHARED SPACE

(71) Applicant: Magic Leap, Inc., Plantation, FL (US)

(72) Inventors: Earle M. Alexander, IV, San Francisco, CA (US); Pedro Luis Arroyo, Fort Lauderdale, FL (US); Jean I. Venerin, San Francisco, CA (US); William Adams, New York, NY (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/470,286

(22) Filed: Sep. 19, 2023

(65) Prior Publication Data
US 2024/0005808 A1    Jan. 4, 2024

Related U.S. Application Data

(63) Continuation of application No. 17/029,670, filed on Sep. 23, 2020, now abandoned.
(Continued)

(51) Int. Cl.
*G09B 5/12* (2006.01)
*G06F 3/01* (2006.01)
(Continued)

(52) U.S. Cl.
CPC ............. *G09B 5/125* (2013.01); *G06F 3/011* (2013.01); *G06T 19/006* (2013.01); *H04L 12/1822* (2013.01)

(58) Field of Classification Search
None
See application file for complete search history.

(56) References Cited

U.S. PATENT DOCUMENTS 6,850,221 B1   2/2005   Tickle
9,824,499 B2   11/2017  Wright et al.
(Continued)

FOREIGN PATENT DOCUMENTS

WO      2021061821 A1    4/2021

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Christopher J Kohlman
(74) *Attorney, Agent, or Firm* — Tobias Intellectual Property Law, PLLC

(57) ABSTRACT

A mixed reality virtual environment is sharable among multiple users through the use of multiple view modes that are selectable by a presenter. Multiple users may wish to view a common virtual object, such as one that is used for educational purposes, such as a piece of art in a museum, automobile, biological specimen, chemical compound, etc. The virtual object may be presented in a virtual room to any number of users. A presentation may be controlled by a presenter (e.g., a teacher of a class of students) that leads multiple participants (e.g., students) through information associated with the virtual object. Use of different viewing modes allows individual users to see different virtual content despite being in a shared viewing space or alternatively, to see the same virtual content in different locations within a shared space.

20 Claims, 23 Drawing Sheets

Related U.S. Application Data

(60) Provisional application No. 62/907,178, filed on Sep. 27, 2019.

(51) Int. Cl.
*G06T 19/00* (2011.01)
*H04L 12/18* (2006.01)

(56) References Cited

U.S. PATENT DOCUMENTS

| | | | |
|---|---|---|---|
| 9,846,972 | B2 | 12/2017 | Montgomerie et al. |
| 10,871,934 | B2 | 12/2020 | Paulovich et al. |
| 2006/0028436 | A1 | 2/2006 | Armstrong |
| 2006/0170652 | A1 | 8/2006 | Bannai et al. |
| 2007/0081123 | A1 | 4/2007 | Lewis |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0371885 | A1 | 12/2016 | Gavriliuc et al. |
| 2017/0199639 | A1 | 7/2017 | O'Hara et al. |
| 2017/0301140 | A1 | 10/2017 | Smith et al. |
| 2018/0307303 | A1 | 10/2018 | Powderly et al. |
| 2018/0349700 | A1 | 12/2018 | Percuoco et al. |
| 2018/0359448 | A1 | 12/2018 | Harries |
| 2019/0130656 | A1* | 5/2019 | Gebbie ............... G06T 19/003 |
| 2019/0232500 | A1 | 8/2019 | Bennett et al. |
| 2019/0250805 | A1* | 8/2019 | Brewer ............... G06F 3/04847 |
| 2019/0253692 | A1 | 8/2019 | El-Imad et al. |
| 2020/0066046 | A1 | 2/2020 | Stahl et al. |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

EP20867763.3 Extended European Search Report dated Sep. 13, 2023.

International Preliminary Report on Patentability for PCT Application No. PCT/US20/52282, issued Mar. 15, 2022.

International Search Report and Written Opinion for PCT Application No. PCT/US20/52282, mailed Jan. 13, 2021.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).

* cited by examiner

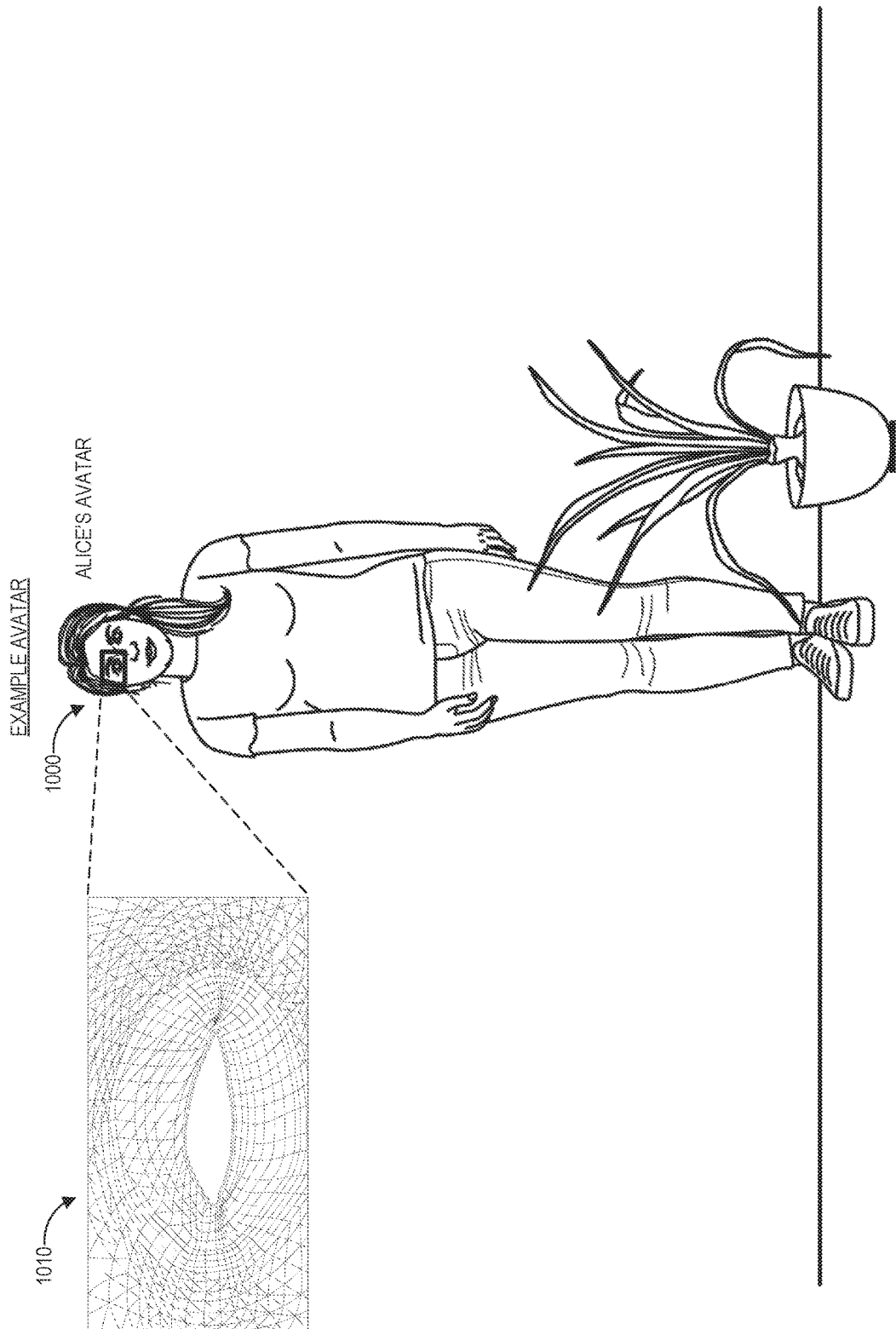

INDIVIDUAL VIEWING IN A SHARED SPACE

PRIORITY CLAIM

This application is a continuation of U.S. application Ser. No. 17/029,670, filed Sep. 23, 2020, titled "INDIVIDUAL VIEWING IN A SHARED SPACE," which claims the benefit of priority under 35 U.S.C. § 119(e) to U.S. Provisional Application No. 62/907,178, filed Sep. 27, 2019, titled "INDIVIDUAL VIEWING IN A SHARED SPACE." The entire contents of each of the above-listed applications is hereby incorporated by reference into this application.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present disclosure relates to virtual reality and augmented reality, including mixed reality, imaging and visualization systems and more particularly to systems and methods for displaying and interacting with virtual content.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 10 illustrates an example of an avatar as perceived by a user of a wearable system.

Figure 1:
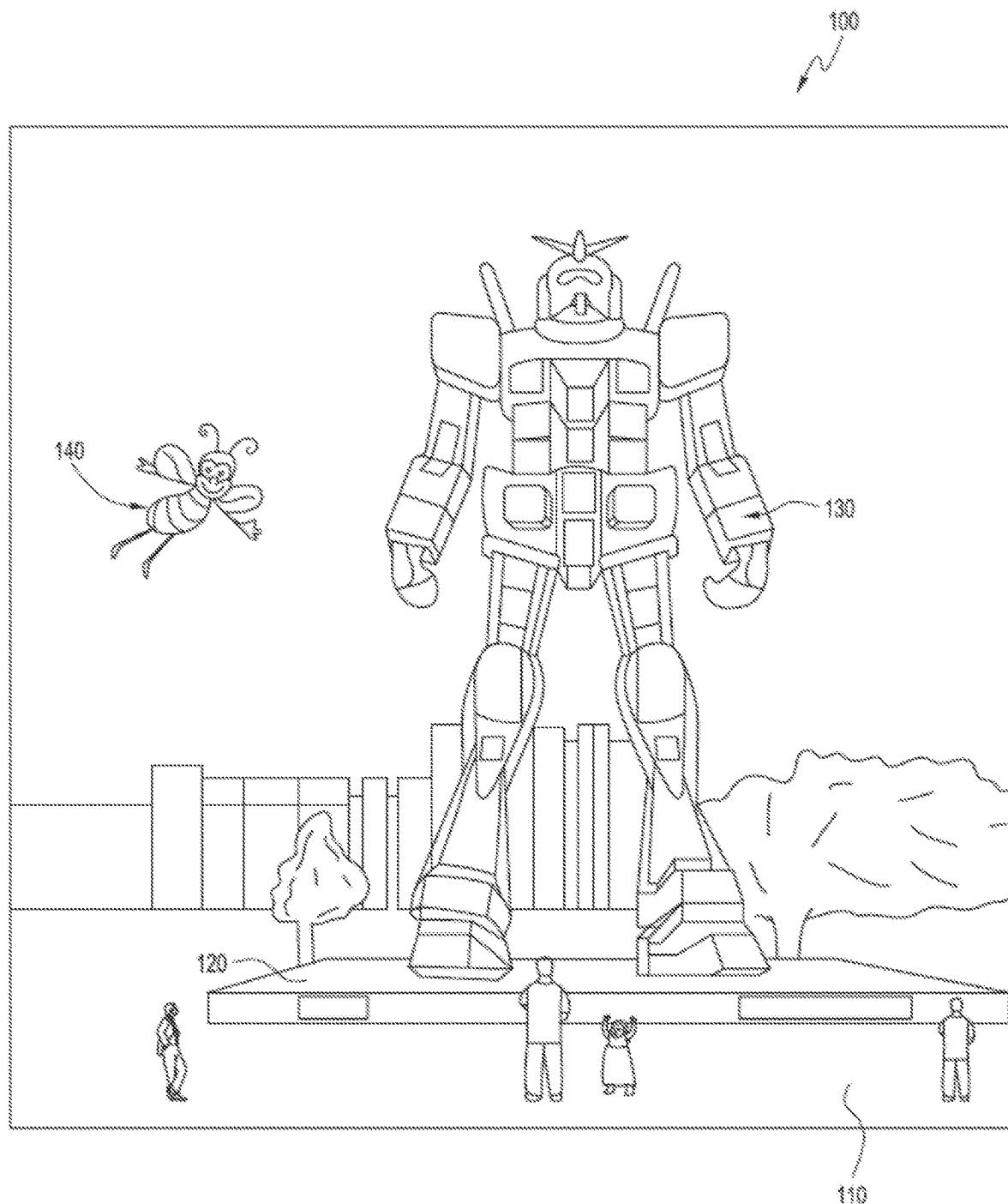
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example implementations described herein and are not intended to limit the scope of the disclosure.

DETAILED DESCRIPTION

Overview

A virtual avatar may be a virtual representation of a real or fictional person or creature or personified object in an AR/VR/MR environment. For example, a virtual avatar may be a virtual representation of a real object, for example, an object in a museum. During a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

In some implementations, multiple users may wish to view a common virtual object. For example, a virtual object that is used for educational purposes, such as a piece of art in a museum, automobile, biological specimen, chemical compound, etc. may be selected by a presenter (e.g., a teacher of a class of students) for analysis, viewing, and/or interaction by multiple participants (e.g., students). As discussed further below, implementations that provide different viewing modes for such groups allow a user, such as a presenter, to customize the viewing experience of multiple participants. Such shared content experiences may make use of spatial computing by leveraging cinema techniques so that the virtual object can feel realistic and perceptually present in the room. This presentation tool may include animation, visual effects, and sound effects of scenes that are associated with portions of a virtual object (e.g., markings that are carved into the body of a statue) in spatial computing. Advantageously, use of different viewing modes allows individual users to see different virtual content despite being in a shared viewing space or alternatively, to see the same virtual content in different locations within a shared space.

Implementations of the disclosed systems and methods may provide for improved avatars and a more realistic interaction between a user of the wearable system and avatars in the user's environment. Although the examples in this disclosure describe animating a human-shaped avatar, similar techniques can also be applied to animals, fictitious creatures, objects, etc.

Examples of 3D Display of a Wearable System

A wearable system (also referred to herein as an augmented reality (AR) system), such as the example discussed below with reference to FIG. 2, can be configured to present 2D or 3D images of virtual objects to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR environment 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a flying cartoon-like avatar character 140 that seems to be a personification of a bumble bee, even though these elements do not exist in the real world.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth planes or based on observing different image features on different depth planes being out of focus. As discussed elsewhere herein, such depth cues provide credible perceptions of depth.

Figure 2:
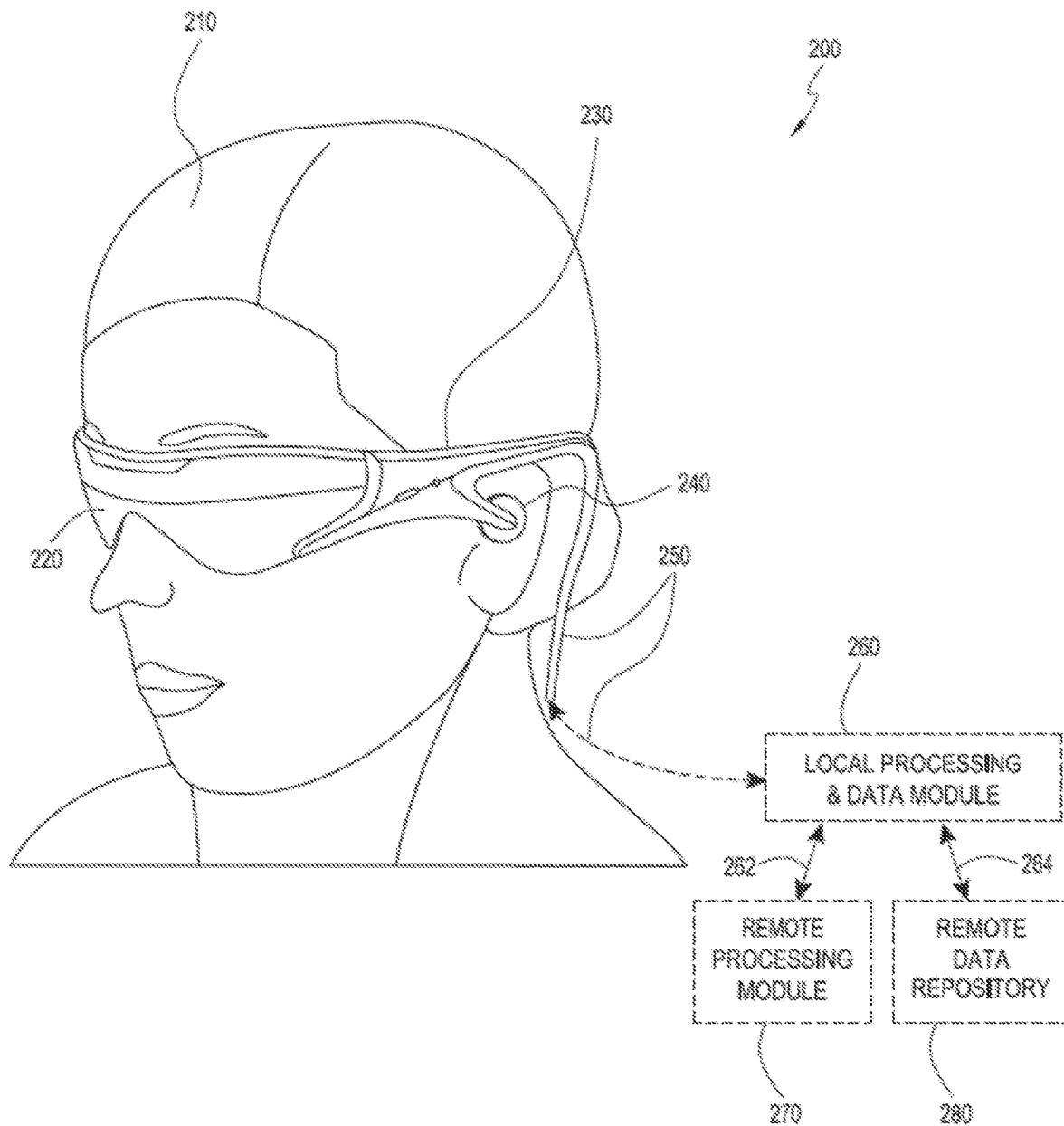
FIG. 2 schematically illustrates an example of a wearable system.

FIG. 2 illustrates an example of wearable system 200 which can be configured to provide an AR/VR/MR scene. The wearable system 200 can also be referred to as the AR system 200 or the wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some implementations, a speaker 240 is coupled to the frame 230 and positioned adjacent the ear canal of the user (in some implementations, another speaker, not shown, is positioned adjacent the other ear canal of the user to provide for stereo/shapeable sound control). The display 220 can include an audio sensor (e.g., a microphone) for detecting an audio stream from the environment and/or capture ambient sound. In some implementations, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 and/or 270, which may process image information acquired by the inward-facing imaging system to determine, e.g., the pupil diameters or orientations of the eyes, eye movements or eye pose of the user 210. The inward-facing imaging system 462 may include one or more cameras or other imaging devices. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and/or storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

In some implementations, the remote processing module 270 may comprise one or more processors configured to analyze and process data or image information. In some implementations, the remote data repository 280 may comprise a digital data storage facility, which may be available through the internet or other networking configuration in a "cloud" resource configuration. In some implementations, all data is stored and all computations (e.g., AR processes discussed herein) are performed in the local processing and data module, allowing fully autonomous use from a remote module. In other implementations, some or all of the computations of certain AR processes discussed herein are performed remotely, such as at a network-connected server.

Example Components of a Wearable System

Figure 3:
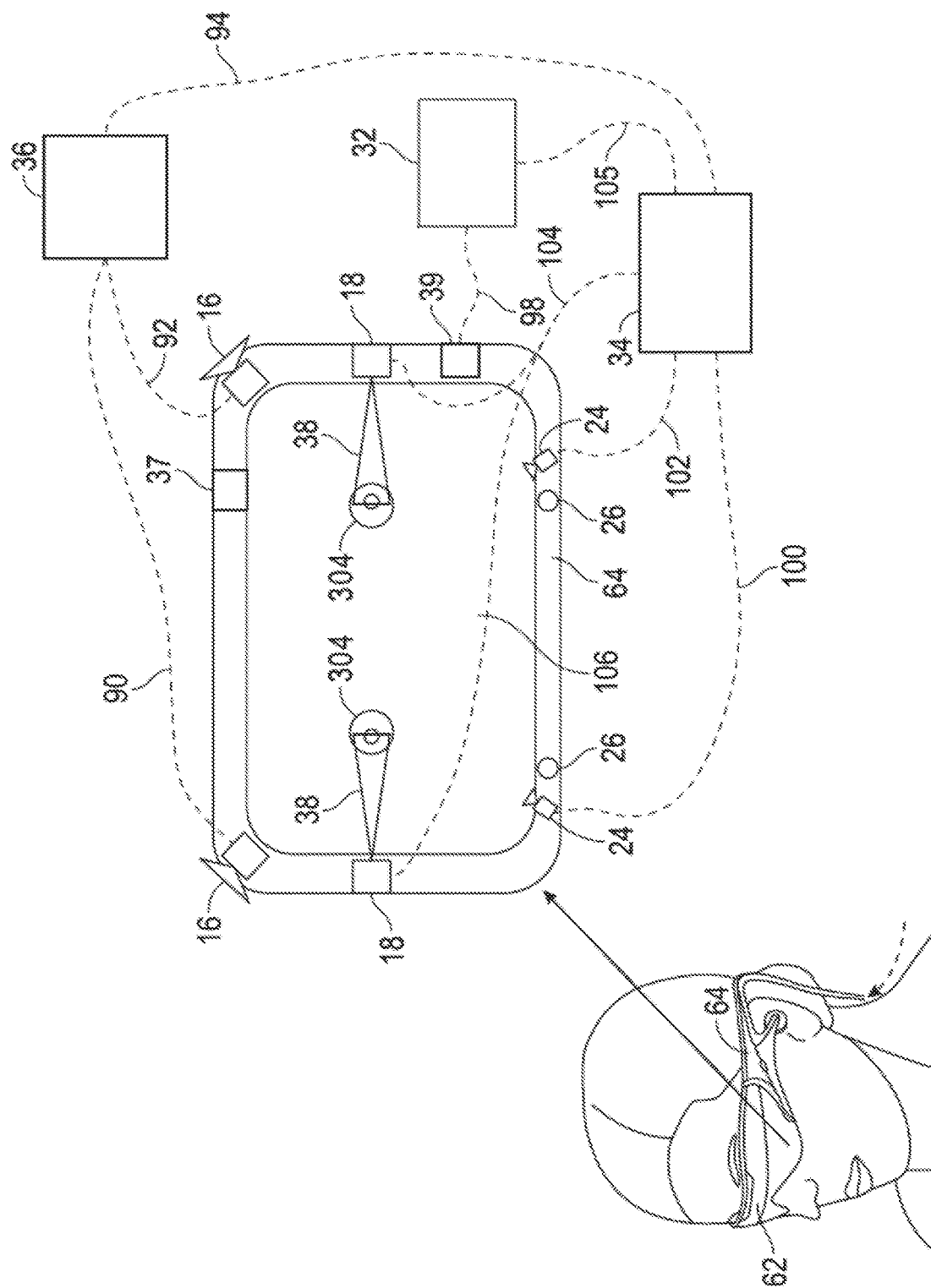
FIG. 3 schematically illustrates example components of a wearable system.

FIG. 3 schematically illustrates example components of a wearable system. FIG. 3 shows the wearable system 200, including the display 220 and the frame 230. A blown-up view 202 schematically illustrates various components of the wearable system 200. In certain implementations, one or more of the components illustrated in FIG. 3 can be part of the display 220. The various components alone or in combination can collect a variety of data (such as e.g., audio or visual data) associated with the user of the wearable system 200 or the user's environment. In other implementations, a wearable system may include additional or fewer components depending on the application for which the wearable system is used. Nevertheless, FIG. 3 provides a basic idea of some of the various components and types of data that may be collected, analyzed, and stored through the wearable system.

In the example of FIG. 3, the display 220 can comprise a display lens 226 that may be mounted to a user's head or a housing or the frame 230. The display lens 226 may comprise one or more transparent mirrors positioned by the frame 230 in front of the user's eyes 302, 304 and may be configured to bounce projected light 38 into the eyes 302, 304 and facilitate beam shaping, while also allowing for transmission of at least some light from the local environment. The wavefront of the projected light beam 38 may be bent or focused to coincide with a desired focal distance of the projected light. As illustrated, two wide-field-of-view machine vision cameras 16 (also referred to as world cameras) can be coupled to the frame 230 to image the environment around the user. These world cameras 16 can be dual capture visible light/non-visible (e.g., infrared) light cameras. The cameras 316 may be part of the outward-facing imaging system 464 shown in FIG. 4. Images acquired by the world cameras 16 can be processed by the pose processor 36. For example, the pose processor 36 can implement one or more object recognizers 708 (e.g., shown in FIG. 7) to identify a pose of a user or another person in the user's environment or to identify a physical object in the user's environment.

The pose processor 36 may include one or more processors, such as an ASIC (application specific integrated circuit), FPGA (field programmable gate array), or ARM processor (advanced reduced-instruction-set machine), which may be configured to calculate real or near-real time user head pose from wide field of view image information output from the world cameras 16. The head pose processor 36 can be a hardware processor and can be implemented as part of the local processing and data module 260 shown in FIG. 2.

With continued reference to FIG. 3, a pair of scanned-laser shaped-wavefront (e.g., for depth) light projector modules 18 with display mirrors and optics configured to project light 38 into the eyes 302, 304 are shown. The depicted view also shows two miniature infrared cameras 24 paired with infrared light (such as light emitting diodes "LED"s), which are configured to be able to track the eyes 302, 304 of the user to support rendering and user input. The cameras 24 may be part of the inward-facing imaging system 462 shown in FIG. 4.

The wearable system 200 can further feature a sensor assembly 39, which may comprise X, Y, and Z axis accelerometer capability and/or a magnetic compass and X, Y, and Z axis gyro capability, preferably providing data at a relatively high frequency, such as 200 Hz or more. The sensor assembly 39 may be part of the IMU described with reference to FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, and/or a depth sensing camera. In certain implementations, where the cameras 316 have depth sensing ability, the cameras 16 may also be considered as depth sensors 234.

In the example of FIG. 3, a sensor pose processor 32 is configured to execute digital and/or analog processing to derive pose from the gyro, compass, and/or accelerometer data from the sensor assembly 39. The sensor pose processor 32 may be part of the local processing and data module 260 shown in FIG. 2.

The wearable system 200 as shown in FIG. 3 can also include a position system such as, e.g., a GPS 37 (global positioning system) to assist with pose and positioning analyses. In addition, the GPS may further provide remotely-based (e.g., cloud-based) information about the user's environment. This information may be used for recognizing objects or information in the user's environment.

The wearable system may combine data acquired by the GPS 37 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 16 (which may be part of the outward-facing imaging system 464 shown in FIG. 4). Based on the images acquired by the world cameras 16, the wearable system 200 can detect objects in the environment (e.g., by using one or more object recognizers 708 shown in FIG. 7). The wearable system can further use data acquired by the GPS 37 to interpret the detected objects, e.g., such as to determine that an object is associated with a character.

The wearable system 200 may also comprise a rendering engine 34 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some implementations, the rendering engine is part of the local processing and data module 260. The rendering engine 34 can be communicatively coupled (e.g., via wired or wireless links) to other components of the wearable system 200. For example, the rendering engine 34, can be coupled to the eye cameras 24 via communication link 274, and/or be coupled to a projecting subsystem 18 (which can project light into user's eyes 302, 304 via a scanned laser arrangement in a manner similar to a retinal scanning display) via the communication link 272. The rendering engine 34 can also be in communication with other processing units such as, e.g., the sensor pose processor 32 and the image pose processor 36 via links 105 and 94 respectively.

The cameras 24 (e.g., mini infrared cameras) may be utilized to track the eye pose to support rendering and user input. Some example eye poses may include where the user is looking or at what depth he or she is focusing (e.g., which may be estimated with eye vergence). The GPS 37, gyros, compass, and/or accelerometers may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some implementations may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 36, sensor pose processor 32, and rendering engine 34 may be positioned in a beltpack and configured to communicate with other components of the wearable system via wireless communication, such as ultra-wideband, Wi-Fi, Bluetooth, etc., or via wired communication. The depicted frame 230 preferably is head-mountable and wearable by the user. However, some components of the wearable system 200 may be worn on other portions of the user's body. For example, the speaker 240 may be inserted into, and/or positioned near, the ears of a user to provide sound to the user.

Regarding the projection of light 38 into the eyes 302, 304 of the user, in some implementations, the cameras 24 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

Spatially coherent light with a beam diameter of less than about 0.7 millimeters can typically be correctly resolved by the human eye regardless of where the eye focuses. Thus, to create an illusion of proper focal depth, the eye vergence may be tracked with the cameras 24, and the rendering engine 34 and projection subsystem 18 may be utilized to render all objects on or close to the horopter in focus, and all other objects at varying degrees of defocus (e.g., using intentionally-created blurring). In one implementation, the display 220 renders to the user at a frame rate of about 60 frames per second or greater. As described above, the cameras 24 may be utilized for eye tracking, and software may be configured to pick up not only vergence geometry but also focus location cues to serve as user inputs. Such a display system may be configured with brightness and contrast suitable for day or night use.

In some implementations, the display system has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the wearable system to know where it is with respect to the real world).

In some implementations, the wearable system 200 is configured to display one or more images of virtual objects (also referred to as "virtual images" herein) based on the accommodation of the user's eyes. Unlike prior 3D display approaches that force the user to focus where the images are being projected, in some implementations, the wearable system is configured to automatically vary the focus of projected virtual content to allow for a more comfortable viewing of one or more images presented to the user. For example, if the user's eyes have a current focus of 1 meter, the image may be projected to coincide with the user's focus. If the user shifts focus to 3 meters, the image is projected to coincide with the new focus. Thus, rather than forcing the user to a predetermined focus, the wearable system 200 of some implementations allows the user's eye to a function in a more natural manner.

Such a wearable system 200 may eliminate or reduce the incidences of eye strain, headaches, and/or other physiological symptoms typically observed with respect to virtual reality devices. To achieve this, various implementations of the wearable system 200 are configured to project virtual images at varying focal distances, through one or more variable focus elements (VFEs). In one or more implementations, 3D perception may be achieved through a multi-plane focus system that projects images at fixed focal planes away from the user. Other implementations employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In some implementations, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some implementations, a spatial light modulator may project the images to the user through various optical components. For example, as described further below, the spatial light modulator may project the images onto one or more waveguides, which then transmit the images to the user.

Example Waveguide Stack Assembly

Figure 4:
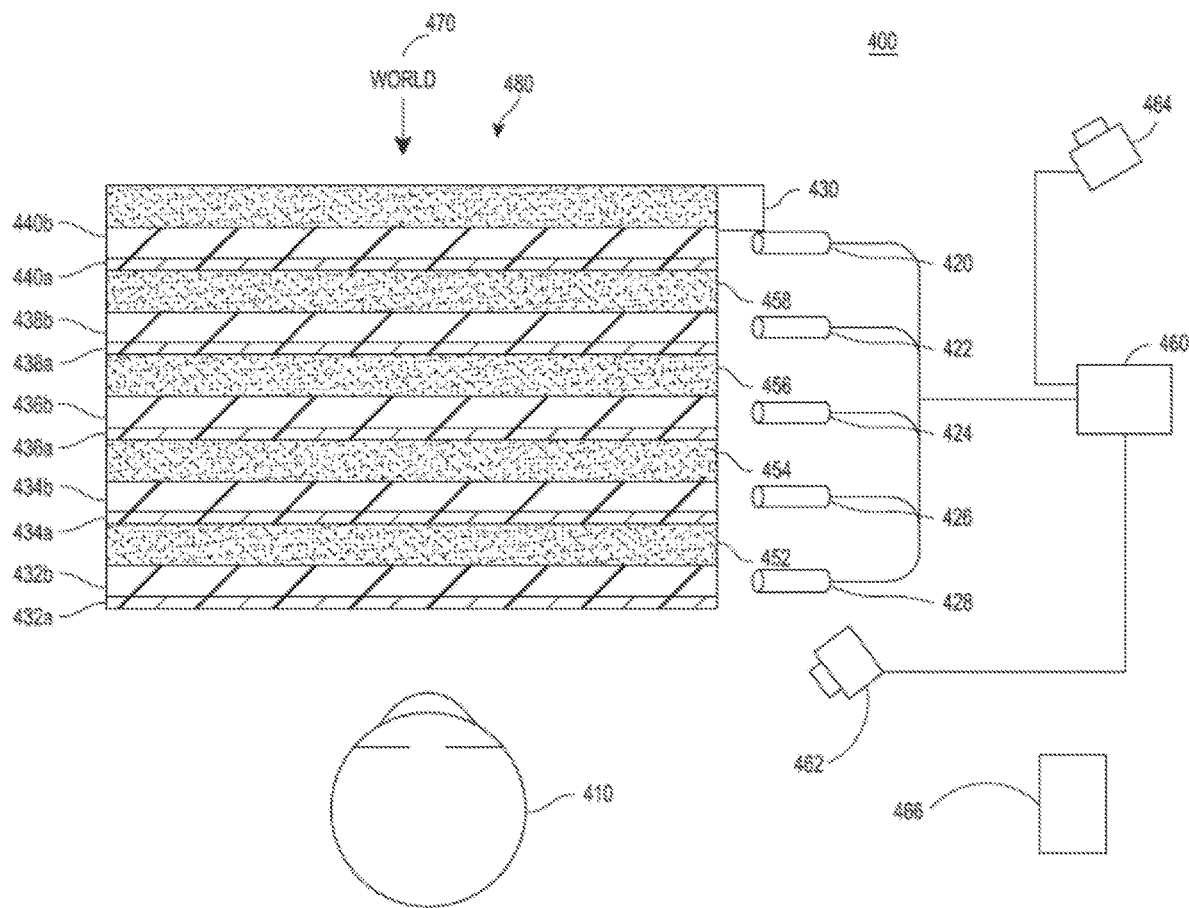
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 440b. In some implementations, the wearable system 400 may correspond to wearable system 200 of FIG. 2, with FIG. 4 schematically showing some parts of the wearable system 200 in greater detail and not showing certain other components. For example, in some implementations, the waveguide assembly 480 may be integrated into the display 220 of FIG. 2.

With continued reference to FIG. 4, the waveguide assembly 480 may also include a plurality of features 458, 456, 454, 452 between the waveguides. In some implementations, the features 458, 456, 454, 452 may be lenses. In other implementations, the features 458, 456, 454, 452 may not be lenses. Rather, they may simply be spacers (e.g., cladding layers or structures for forming air gaps).

The waveguides 432b, 434b, 436b, 438b, 440b and/or the plurality of lenses 458, 456, 454, 452 may be configured to send image information to the eye with various levels of wavefront curvature or light ray divergence. Positions of the waveguides (e.g., from the eye 410) may be associated with different depth planes and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across the respective waveguide, for output toward the eye 410. In this example, light exits an output surface of the image injection devices 420, 422, 424, 426, 428 and is injected into a corresponding input edge of the waveguides 440b, 438b, 436b, 434b, 432b. In some implementations, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some implementations, the image injection devices 420, 422, 424, 426, 428 are discrete displays that each produce image information for injection into a corresponding waveguide 440b, 438b, 436b, 434b, 432b, respectively. In some implementations, the image injection devices 420, 422, 424, 426, 428 are the output ends of a single multi-plexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some implementations, the controller 460 may be a single integral device, or a distributed system connected by wired or wireless communication channels. The controller 460 may be part of the processing modules 260 or 270 (illustrated in FIG. 2) in some implementations.

The waveguides 440b, 438b, 436b, 434b, 432b may be configured to propagate light within each respective waveguide by total internal reflection (TIR). The waveguides 440b, 438b, 436b, 434b, 432b may be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some implementations, the light extracting optical elements 440a, 438a, 436a, 434a, 432a may be disposed at the top or bottom major surfaces, or may be disposed directly in the volume of the waveguides 440b, 438b, 436b, 434b, 432b. In some implementations, the light extracting optical elements 440a, 438a, 436a, 434a, 432a may be formed in a layer of material that is attached to a transparent substrate to form the waveguides 440b, 438b, 436b, 434b, 432b. In some implementations, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to the example of FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative implementations, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some implementations, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some implementations, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some implementations, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some implementations, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some implementations, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an implementation of the local processing and data module 260) can be configured or programmed to cease providing image information to one of these waveguides. Advantageously, this may reduce the processing burden on the system, thereby increasing the responsiveness of the system. In implementations in which the DOEs for a waveguide are switchable between the on and off states, the DOEs may be switched to the off state when the waveguide does receive image information.

In some implementations, it may be desirable to have an exit beam meet the condition of having a diameter that is less than the diameter of the eye of a viewer. However, meeting this condition may be challenging in view of the variability in size of the viewer's pupils. In some implementations, this condition is met over a wide range of pupil sizes by varying the size of the exit beam in response to determinations of the size of the viewer's pupil. For example, as the pupil size decreases, the size of the exit beam may also decrease. In some implementations, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the FOV of the viewer 210 of the wearable system 400. The entire region available for viewing or imaging by a viewer may be referred to as the field of regard (FOR). The FOR may include 47 steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor, e.g., a microphone, to capture ambient sound. As described above, in some implementations, one or more other audio sensors can be positioned to provide stereo sound reception useful to the determination of location of a speech source. The audio sensor can comprise a directional microphone, as another example, which can also provide such useful directional information as to where the audio source is located. The wearable system 400 can use information from both the outward-facing imaging system 464 and the audio sensor in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker.

As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 462 (e.g., a digital camera), which observes the movements of the user, such as the eye movements and the facial movements. The inward-facing imaging system 462 may be used to capture images of the eye 410 to determine the size and/or orientation of the pupil of the eye 304. The inward-facing imaging system 462 can be used to obtain images for use in determining the direction the user is looking (e.g., eye pose) or for biometric identification of the user (e.g., via iris identification). In some implementations, at least one camera may be utilized for each eye, to separately determine the pupil size or eye pose of each eye independently, thereby allowing the presentation of image information to each eye to be dynamically tailored to that eye. In some other implementations, the pupil diameter or orientation of only a single eye 410 (e.g., using only a single camera per pair of eyes) is determined and assumed to be similar for both eyes of the user. The images obtained by the inward-facing imaging system 462 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an implementation of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
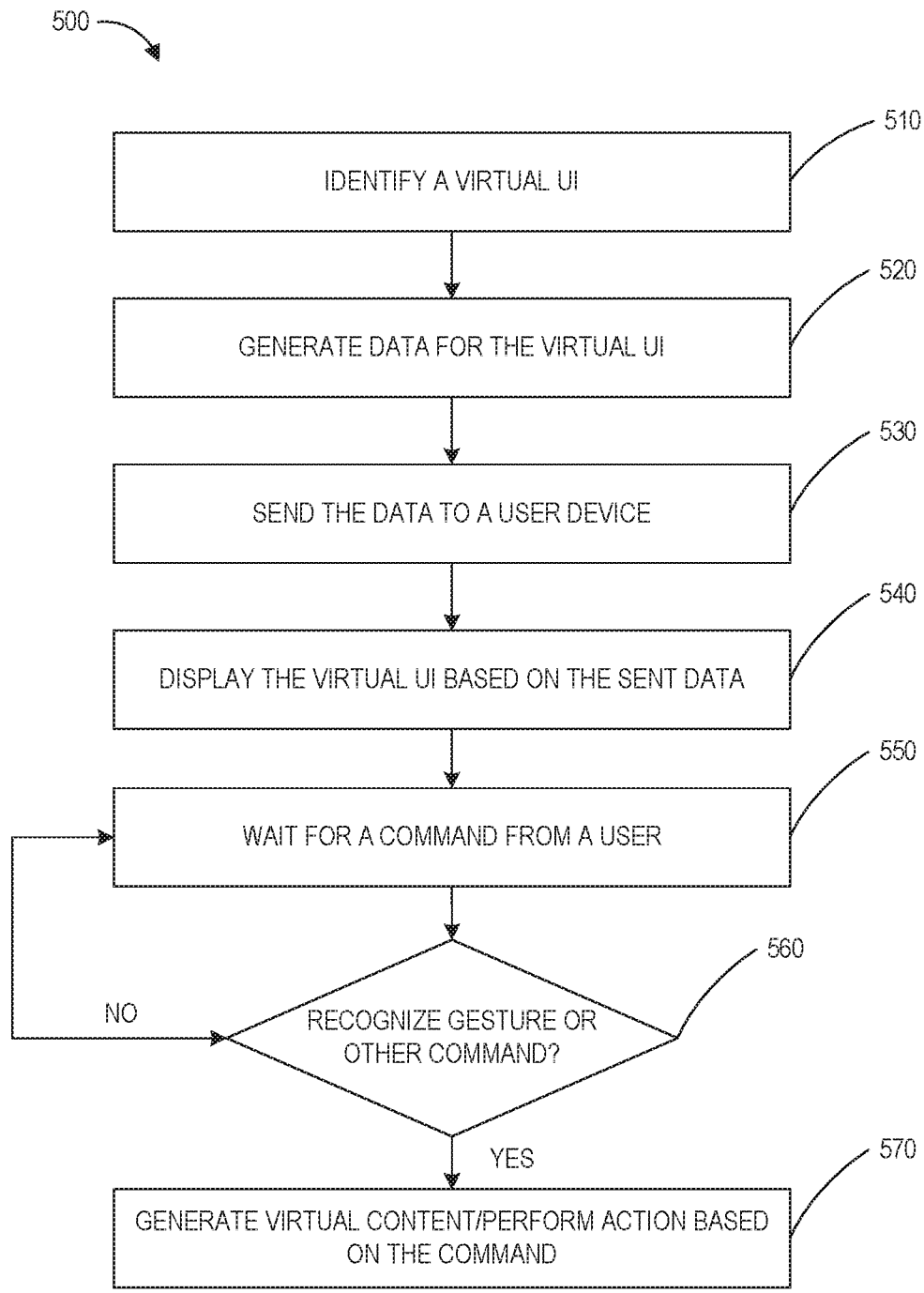
FIG. 5 is a flowchart illustrating an example process of interacting with a virtual user interface.

FIG. 5 is a process flow diagram of an example of a method 500 for interacting with a virtual user interface. The method 500 may be performed by the wearable system described herein. Implementations of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
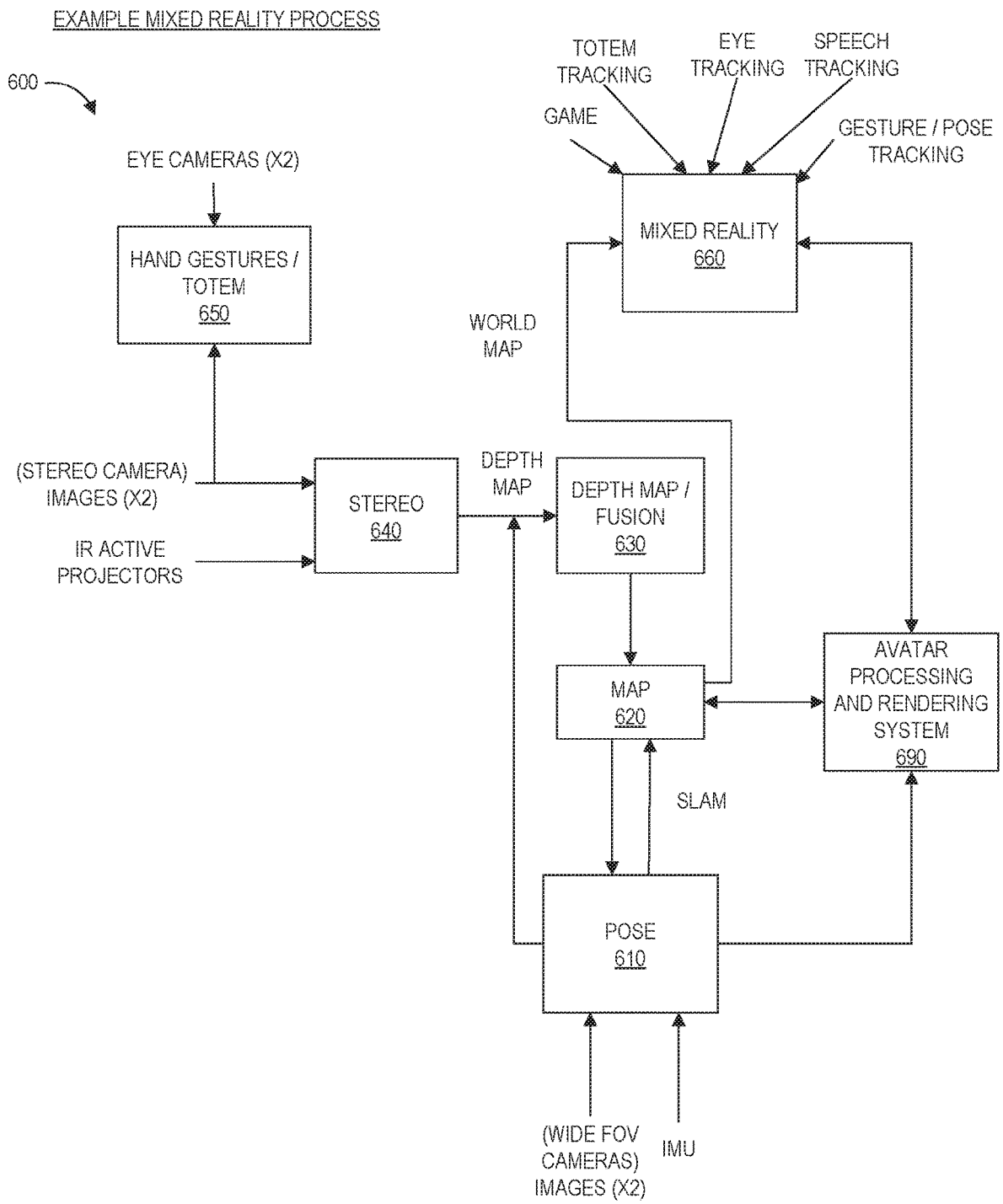
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one implementation, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the implementation depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one implementation, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one implementation, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 270 alone or in combination. In various implementations, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
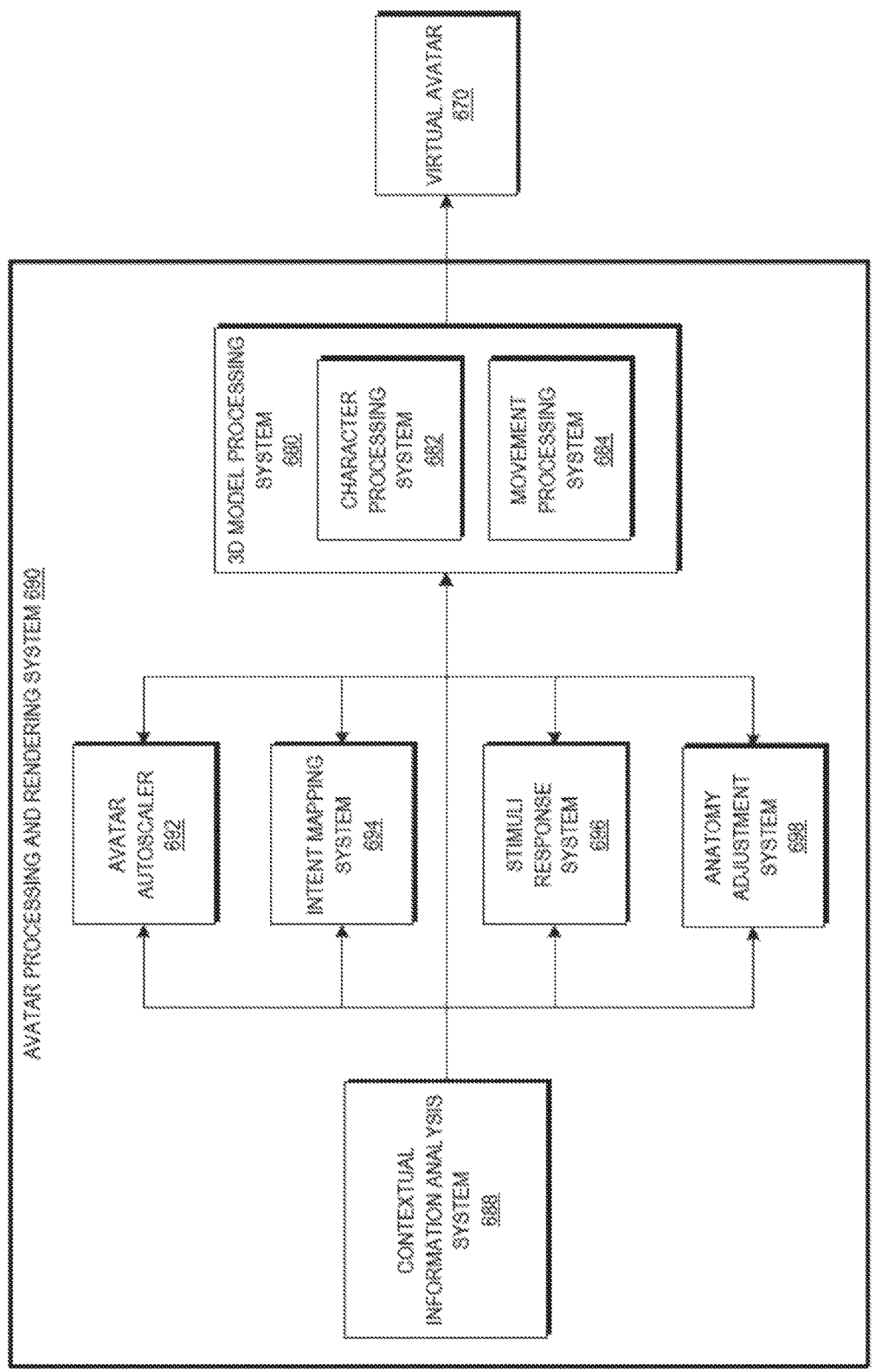
FIG. 6B is a block diagram illustrating example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some implementations, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
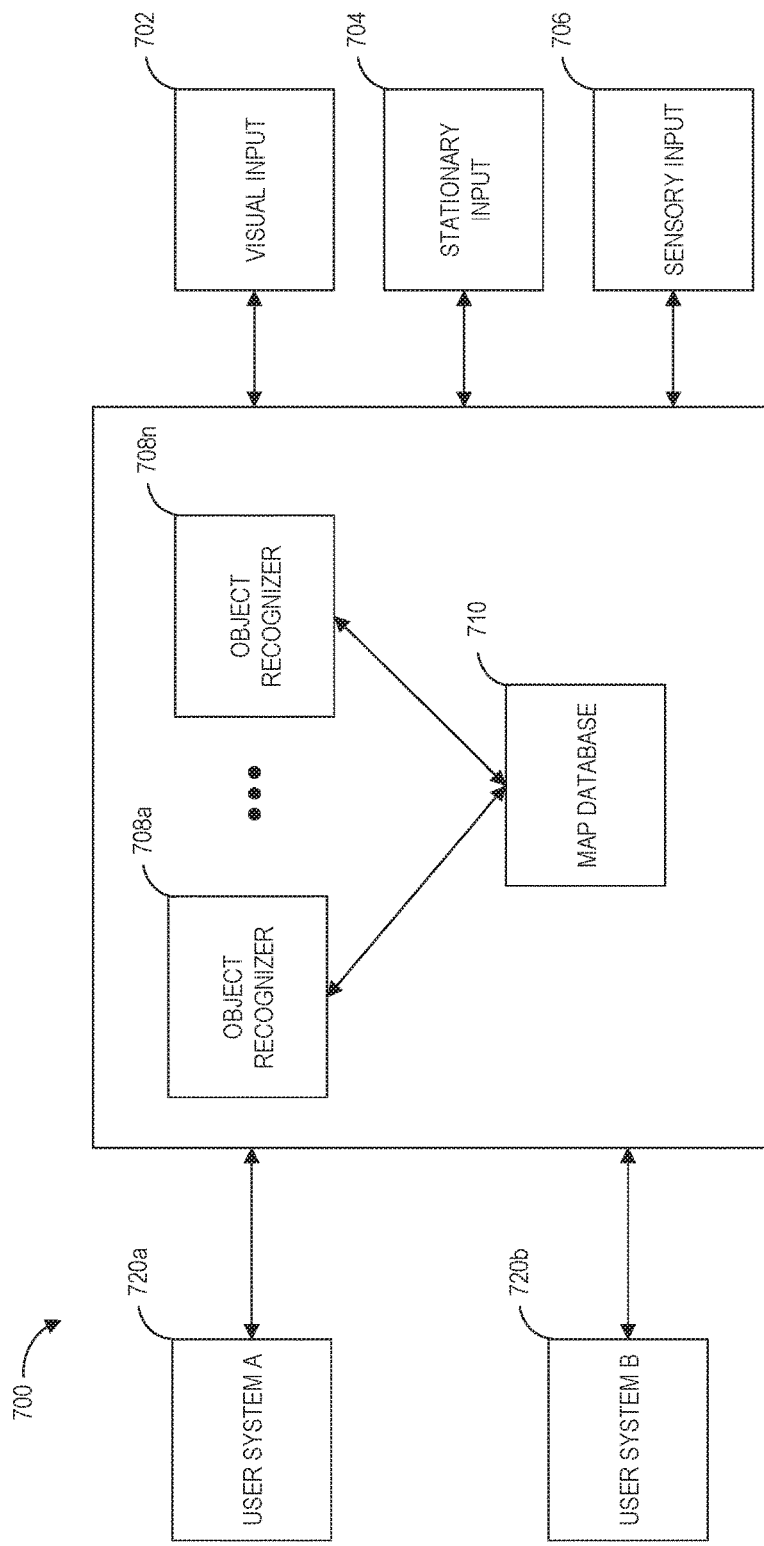
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some implementations, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some implementations, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
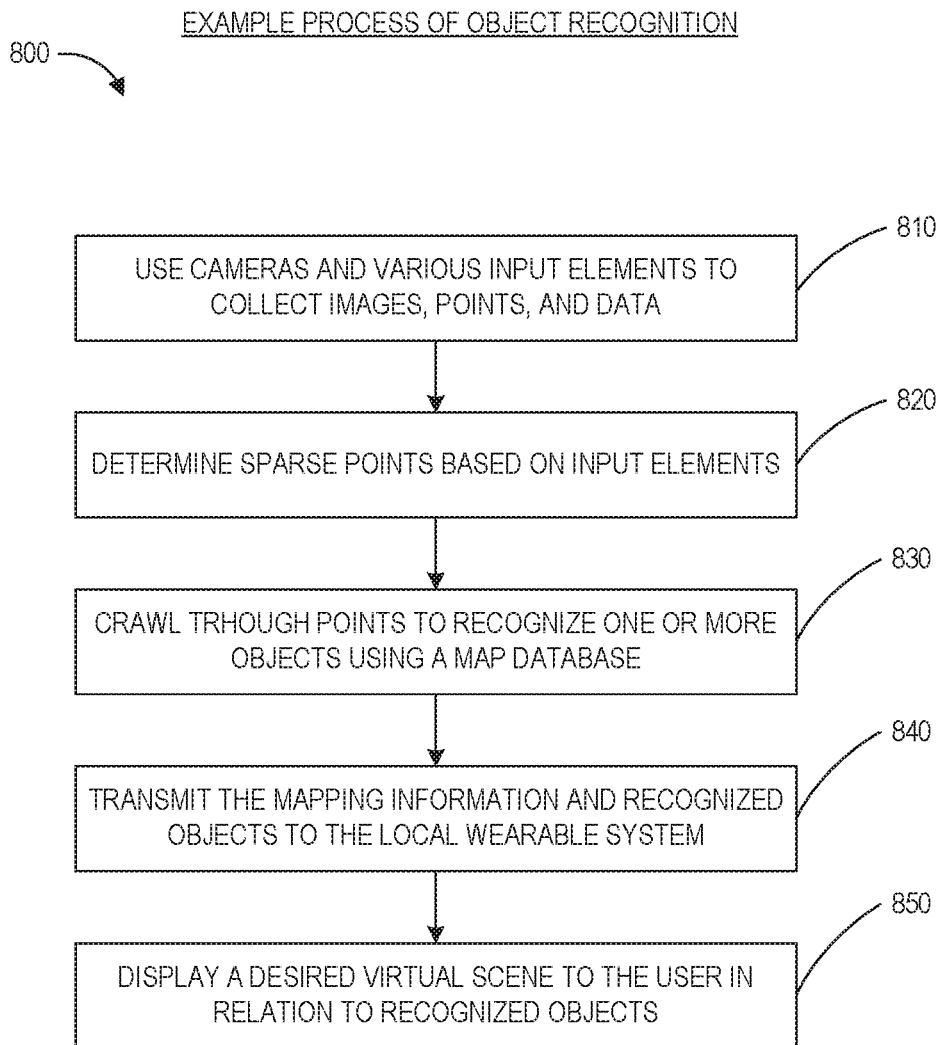
FIG. 8 is a flowchart illustrating an example process of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
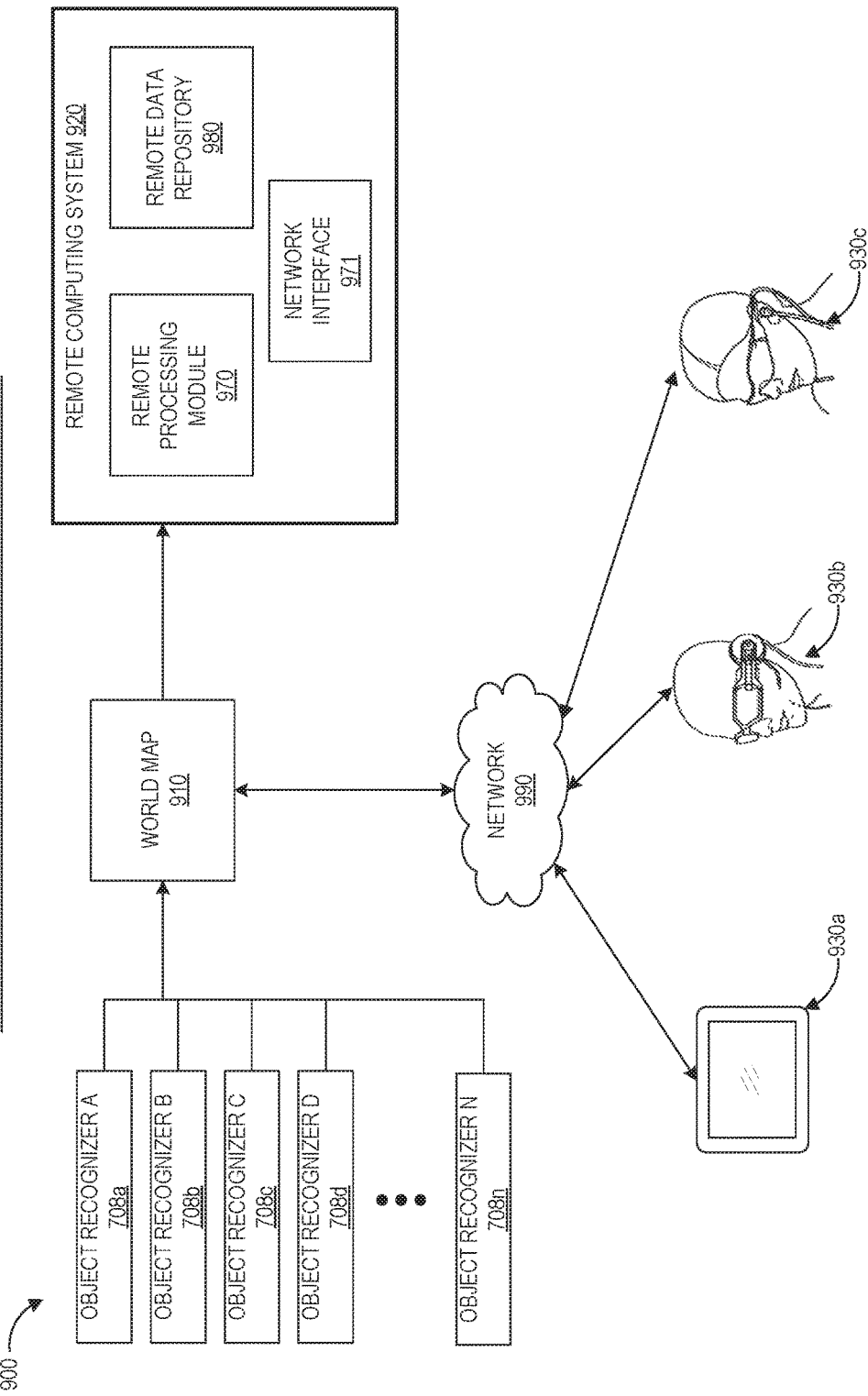
FIG. 9A schematically illustrates components of a system that coordinates interactions between multiple wearable systems.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environ-ment (e.g., world maps of the user's environment), or configurations of avatars of the users. The remote data repository may be an implementation of the remote data repository 280 shown in FIG. 2. The remote computing system 920 may also include a remote processing module 970. The remote processing module 970 may be an implementation of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an implementation of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 920 (FIG. 9A) can construct, update, and build a collection of images, points and other information using the information obtained from the user devices. For example, the user device may process raw information acquired and send the processed information to the remote computing system 920 for further processing. The user device may also send the raw information to the remote computing system 920 for processing. The user device may receive the processed information from the remote computing system 920 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

Figure 9B:
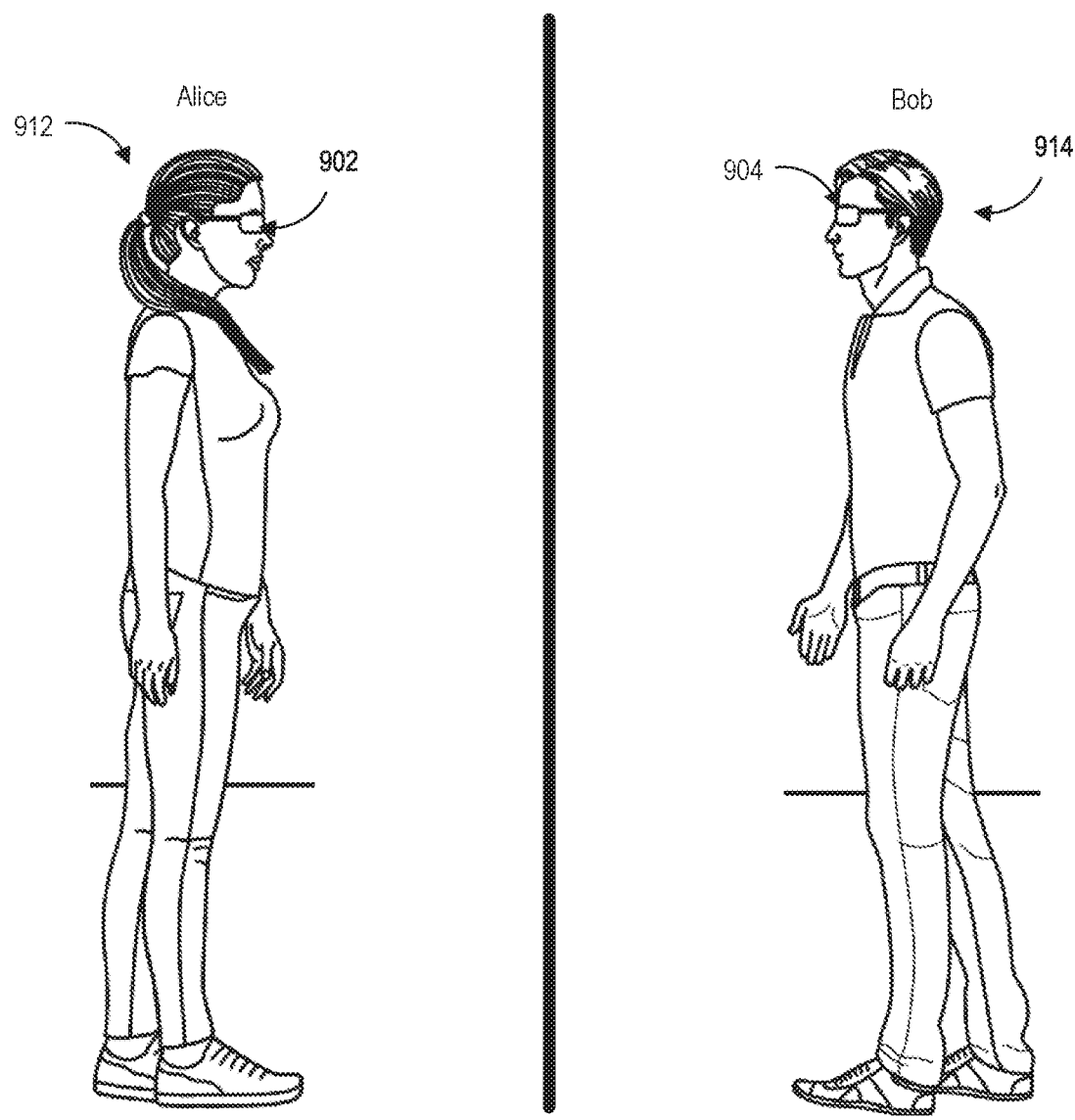
FIG. 9B illustrates an example telepresence session.

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the wearable system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some implementations, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR wearable system 200, while making as few compromises to the final quality as possible. In some implementations, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Figure 11:
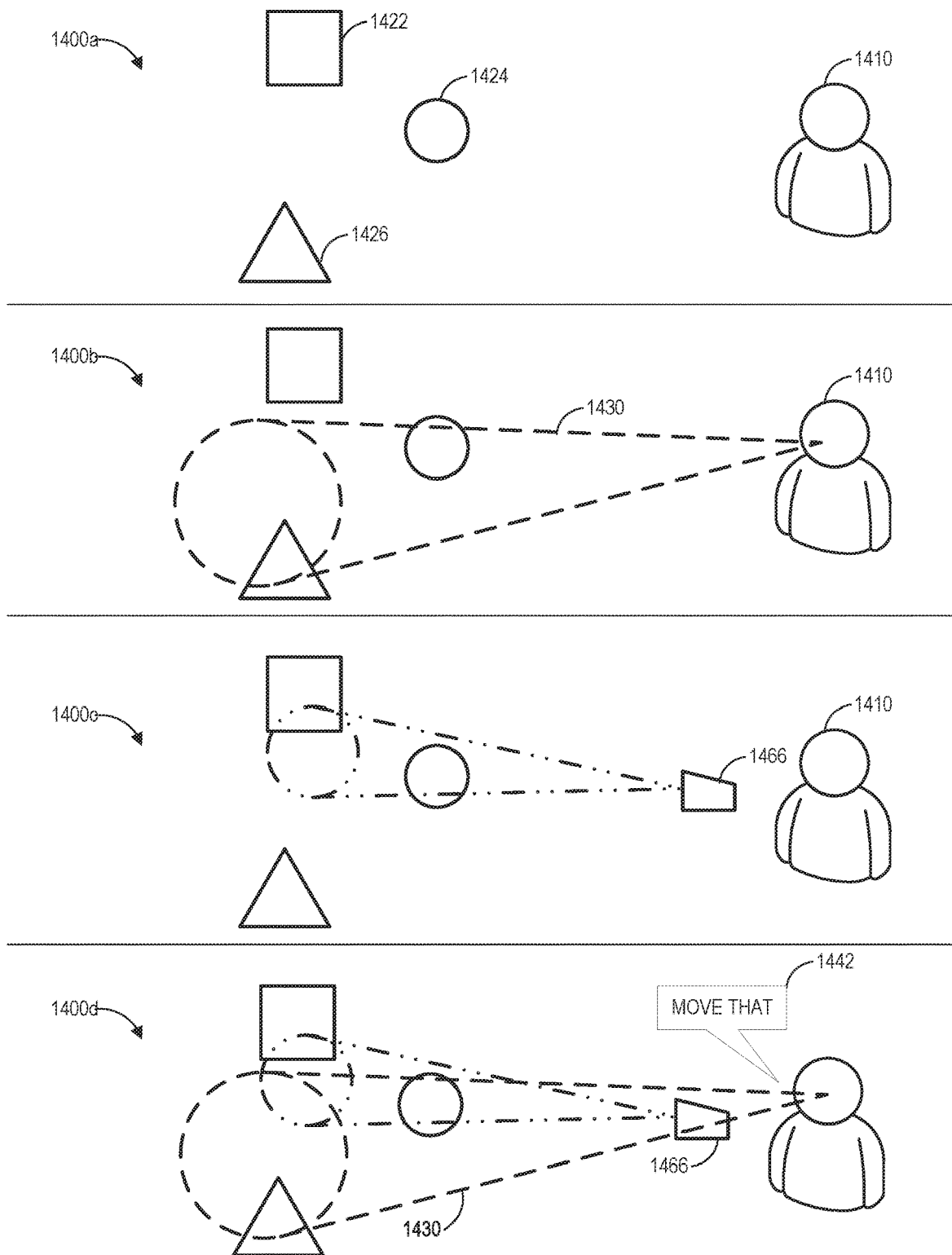
FIG. 11 illustrates examples of selecting a virtual object using a combination of user input modes.

FIG. 11 illustrates examples of selecting a virtual object using a combination of user input modes. In the scene 1400a, the wearable system can present a user 1410 with a plurality of virtual objects, represented by a square 1422, a circle 1424, and a triangle 1426. The user 1410 can interact with the virtual objects using head pose as illustrated in the scene 1400b. This is an example of a head pose input mode.

The head pose input mode may involve a cone cast to target or select virtual objects. For example, the wearable system can cast a cone 1430 from a user's head toward the virtual objects. The wearable system can detect whether one or more of the virtual objects fall within the volume of the cone to identify which object the user intends to select. In this example, the cone 1430 intersects with the circle 1424 and the triangle 1426. Therefore, the wearable system can determine that the user intends to select either the circle 1424 or the triangle 1426. However, because the cone 1430 intersects with both the circle 1424 and the triangle 1426, the wearable system may not be able to ascertain whether the target virtual object is the circle 1424 or the triangle 1426 based on the head pose input alone.

In the scene 1400c, the user 1410 can interact with the virtual objects by manually orienting a user input device 466, such as totem (e.g., a handheld remote control device). This is an example of a gesture input mode. In this scene, the wearable system can determine that either the circle 1424 or the square 1422 is the intended target because these two objects are in the direction at which the user input device 466 is pointing. In this example, the wearable system can determine the direction of the user input device 466 by detecting a position or orientation of the user input device 466 (e.g., via an IMU in the user input device 466), or by performing a cone cast originating from the user input device 466. Because both the circle 1424 and the square 1422 are candidates for the target virtual object, the wearable system cannot ascertain with a high confidence level which one of them is the object that the user actually wants to select based solely on the gesture input mode.

In the scene 1400d, the wearable system can use multimodal user inputs to determine the target virtual object. For example, the wearable system can use both the results obtained from the cone cast (head pose input mode) and from the orientation of the user input device (gesture input mode) to identify the target virtual object. In this example, the circle 1424 is the candidate identified in both the result from the cone cast and the result obtained from the user input device. Therefore, the wearable system can determine with high confidence, using these two input modes, that the target virtual object is the circle 1424. As further illustrated in the scene 1400 *d*, the user can give a voice command 1442 (illustrated as "Move that"), which is an example of a third input mode (namely, voice), to interact with the target virtual object. The wearable system can associate the word "that" with the target virtual object, the word "Move" with the command to be executed, and can accordingly move the circle 1424. However, the voice command 1442 by itself (without indications from the user input device 466 or the cone cast 143) may cause confusion to the wearable system, because the wearable system may not know which object is associated with the word "that".

Advantageously, in some embodiments, by accepting multiple modes of input to identify and interact with a virtual object, the amount of precision required for each mode of input may be reduced. For example, the cone cast may not be able to pinpoint an object at a rendering plane that is far away because the diameter of the cone increases as the cone gets farther away from the user. As other examples, the user may need to hold the input device at a particular orientation to point toward a target object and speak with a particular phrase or pace to ensure the correct voice input. However, by combining the voice input and the results from the cone cast (either from a head pose or a gesture using the input device), the wearable system can still identify the target virtual object without requiring either input (e.g., the cone cast or the voice input) to be precise. For example, even though the cone cast selects multiple objects (e.g., as described with reference to scenes 1400*b*, 1400*c*), the voice input may help narrow down the selection (e.g., increase the confidence score for the selection). For example, the cone cast may capture 3 objects, among which the first object is to the user's right, the second object is to the user's left, and the third object is in the center of the user's FOV. The user can narrow the selection by saying "select the rightmost object". As another example, there may be two identically shaped objects in the user's FOV. In order for the user to select the correct object, the user may need to give more descriptions to the object via voice command. For example, rather than saying "select the square object", the user may need to say "select the square object that is red". However, with cone cast, the voice command may not have to be as precise. For example, the user can look at one of the square object and say "select the square object" or even "select the object". The wearable system can automatically select the square object that coincides with the user's gaze direction and will not select the square object that is not in the user's gaze direction.

In some embodiments, the system may have a hierarchy of preferences for combinations of input modes. For example, a user tends to look in the direction his or her head is pointing; therefore, eye gaze and head pose may provide information that is similar to each other. A combination of head pose and eye gaze may be less preferred, because the combination does not provide much extra information as compared to the use of eye gaze alone or head pose alone. Accordingly, the system may use the hierarchy of modal input preferences to select modal inputs that provide contrasting information rather than generally duplicative information. In some embodiments, the hierarchy is to use head pose and voice as the primary modal inputs, followed by eye gaze and gesture.

Accordingly, as described further herein, based on multimodal inputs, the system can calculate a confidence score for various objects in the user's environment that each such object is the target object. The system can select, as the target object, the particular object in the environment that has the highest confidence score.

Shared Content Viewing

In some implementations, multiple users may wish to view a common virtual object. For example, a virtual object that is used for educational purposes, such as a piece of art in a museum, automobile, biological specimen, chemical compound, etc. may be selected by a presenter (e.g., a teacher of a class of students) for analysis, viewing, and/or interaction by multiple participants (e.g., students). As discussed further below, implementations that provide different viewing modes for such groups allow a user, such as a presenter, to customize the viewing experience of multiple participants. Such shared content experiences may make use of spatial computing by leveraging cinema techniques so that the virtual object can feel realistic and perceptually present in the room. This presentation tool may include animation, visual effects, and sound effects of scenes that are associated with portions of a virtual object (e.g., markings that are carved into the body of a statue) in spatial computing. Advantageously, use of different viewing modes allows individual users to see different virtual content despite being in a shared viewing space or alternatively, to see the same virtual content in different locations within a shared space.

In an example implementation, an avatar processing and rendering system 690 (e.g., FIG. 6B) determines and communicates a view mode to multiple wearable systems associated with a virtual scene. The view modes may include modes that display to respective users of the wearable systems a shared portion of a virtual scene associated with the virtual object that is the same for each wearable system, an individual portion of the virtual scene associated with the virtual object that is customizable by the individual users, or some combination of shared and individual content. In some implementations, a first view mode displays a detail view of information (e.g., a panel) associated with the virtual object at a location relative to a current head pose of the individual users of the wearable systems, such that position of the detail view is customized for each user. A second view mode may be available to display the detail view at another location with reference to the virtual object.

In some implementations, the shared portion of the virtual scene is at a fixed real world location for all users and the individual portion of the virtual scene is positioned relative to each individual user at the corresponding different real world locations of the users. Each wearable system may be configured to allow the user to virtually move in the shared portion of the virtual scene without affecting movement of other users within the virtual scene.

Figure 12:
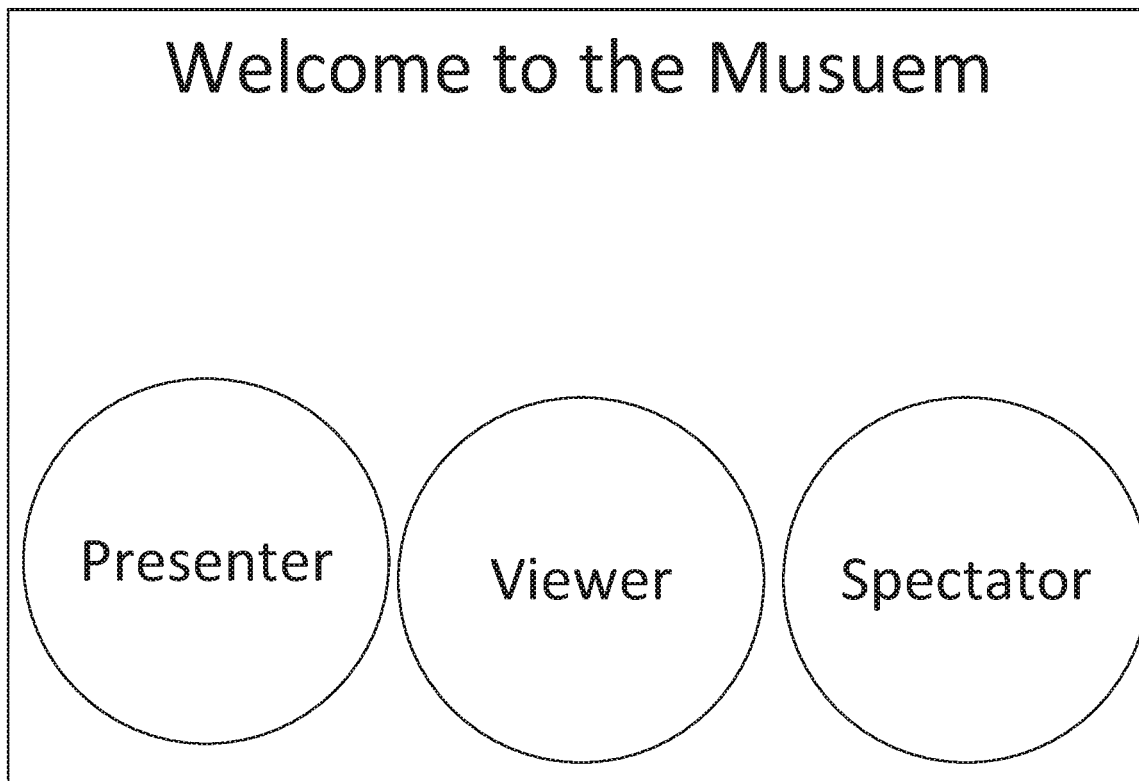
FIG. 12 illustrates an example welcome screen user interface configured to allow multiple users to interact with museum objects in accordance with various view modes that are available to the presenter.

In some embodiments, a user that accesses a shared viewing environment may be required to identify a role of the user, such as whether the user is the presenter (e.g., teacher), a participant (e.g., a student), or a spectator (e.g. view only mode, or guest with full or partial functionality). FIG. 12 illustrates an example user interface depicting a welcome screen to a museum configured to allow multiple users to interact with museum objects in accordance with various view modes that are available to the presenter. In this example, once a user selects whether they are the presenter, a participant, or a spectator, they may be transported to a virtual environment including one or more virtual objects, such as, for example, artifacts or art of the museum. In some embodiments, certain of the user roles may require credentials to access the virtual environment. For example, if a user selects the presenter role, credentials that confirm the user really is the presenter (e.g. a teacher of a student class) may be required before the user is allowed to control viewing capabilities of other users.

In some implementations, a presenter (e.g., a teacher) will be able to join or create a room, manipulate the virtual objects (e.g., a statue in the room), and/or broadcast their voice and/or actions to all other users. In some implementations, a room must have at least one presenter in order for the virtual environment to be visible to the other users. A user that joins as a participant (e.g., a student in some implementations) will be able to view the virtual objects (e.g., a statue) in the participant's environment (e.g., the statue may appear to be standing on the kitchen floor of a student's dorm room), as well as see the presenter's actions and hear the presenter's voice. The participants may be allowed to broadcast "likes" to other users and/or to speak directly to one or more users, such as to the presenter and/or to the entire class. A spectator may have the same capabilities as a participant or the spectator may be assigned different capabilities. For example, in some implementations a spectator may be required to provide different credentials than a participant. In some embodiments, a spectator may be limited to a view only mode. In some embodiments, a spectator may have the same functionality as a viewer, but a viewer may be required to have a profile comprising personal information (e.g. name, personal preferences, and/or visit history, etc.) whereas a spectator may not be required to have a profile.

In some implementations, the presenter controls the view of all of the users in the virtual room. In other implementations, the participants are given some autonomy in their individual views. For example, the participants may be allowed to initiate a customized zoomed in view of the virtual object so that they are able to have, on an individual basis, a break out of a global view (e.g., a normal view mode, or a group view mode) as a personal subset of that global view (e.g., an individual, group, or classroom view). Thus, in some implementations participants may actually have two or more views of the virtual object concurrently activated, such as a main group view (that is the same as all other users) and a smaller customized view that the user independently controls. In some implementations, virtual content that is viewed by individual users is customized for the particular user.

For purposes of illustration, certain examples discussed below are with reference to viewing of a statue by a class of students (e.g., a group of participants) and a teacher (e.g., a presenter). However, the systems and methods discussed herein with reference to this particular implementation are equally applicable to viewing of other objects, in other environments, by different groups of users, and with the same or similar view modes. Thus, discussion of particular users (e.g., students) viewing particular virtual object (e.g., a statue or other museum artifact) should be construed to include discussion of any possible user viewing any other virtual object.

In some implementations, each user that joins a virtual room is asked to provide a name and/or other identifying information, or the information may be automatically accessed from profile information of the user that is already stored by the wearable system. The user may then be directed to place the virtual object (e.g., a statue that the presenter has selected for display to a class of students) within the user's environment. This may be performed, for example, by the user looking around his or her environment and pointing a controller at the ground (or other device or gesture) to indicate where the virtual object should be positioned. Once a suitable location for the virtual object is identified, the user can hold the trigger button to place the virtual object at that location. As discussed elsewhere herein, the placement of a virtual object may be restricted based on several factors, such as orientation of a flat surface and open area of the flat surface. For example, a student participant may not be allowed to place a statue on an office chair, but would be allowed to place the statue on a wide flat horizontal surface in the student's kitchen.

Once a presenter has joined a room, a session has officially begun and all users will be able to hear and see the presenter, as well as see where the presenter is pointing, which may be indicated by a line emitting from the presenter's avatar. In some implementations, once a presenter has entered a room, their voice will be broadcast to all users. Voice input may be configured as one-way (e.g., the students cannot talk to the presenter) or with varying rights for two-way communications (e.g., the students may be allowed to talk to the presenter and/or the entire group of students, such as in response to being authorized to speak by the teacher after the student requests to speak).

For the presenter, in some embodiments, the controller of the presenter's wearable device may act as a pointer and a tool that is usable to select items in the session. For example, the controller may be pointed at an item and the trigger pressed to select the item for interaction. In some implementations, the pointer of the presenter and all presenter actions are viewable by other users in the room. In some embodiments, the presenter may be allowed to temporarily pause broadcast of movements and actions.

Example Virtual Object Manipulations

Depending on the implementation, various manipulations of virtual objects are possible. For example, a first set of manipulations may be provided for two-dimensional artwork, while another set of manipulations is provided for three-dimensional artwork. Manipulation of a virtual object may only be available to a presenter, or in some implementations one or more participants or spectators may be temporarily or permanently provided rights to manipulate the virtual object. For example, a teacher may provide temporary virtual object rotation rights to a student so that the student can manipulate the virtual object to show understanding of a concept.

Figure 13A:
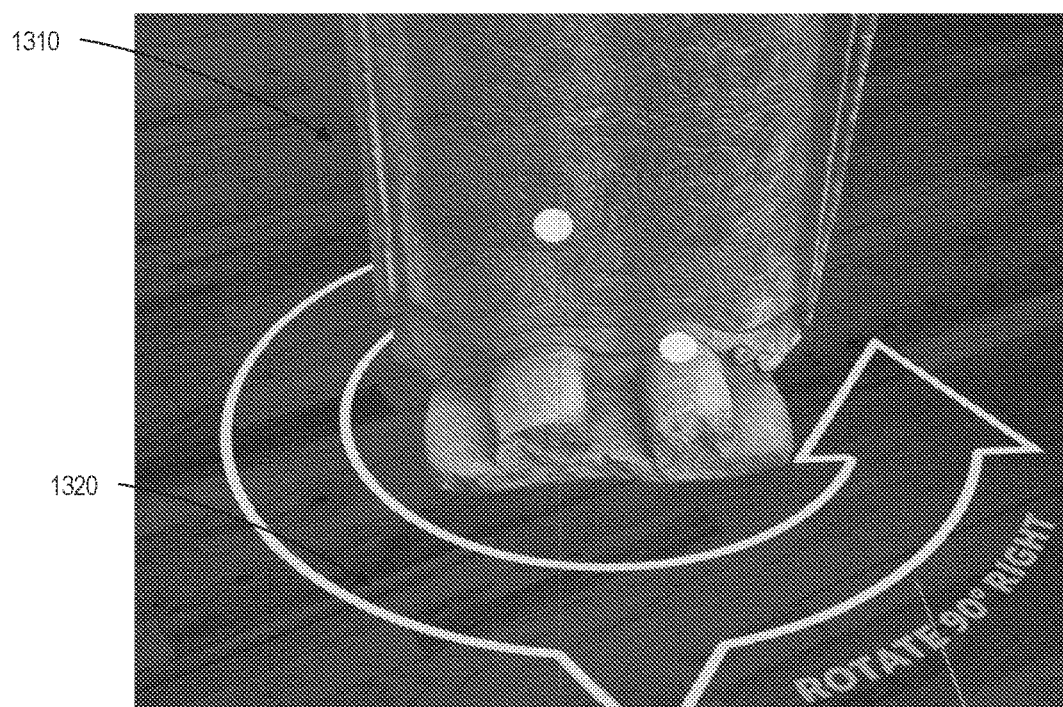
FIGS. 13A-13D illustrate example manipulations that may be performed by a presenter (and/or participants in certain implementations).

FIGS. 13A-13D illustrate example manipulations that may be performed by a presenter (and/or participants in certain implementations). FIG. 13A illustrates a rotation manipulation of a statue 1310. In this example, the presenter is able to rotate the statue 1310 by pointing the controller at the arrows 1320 located around the bottom of the statue. As noted above, rotating the statue by the presenter will also cause rotation of the statue for all other users.

Figure 13B:
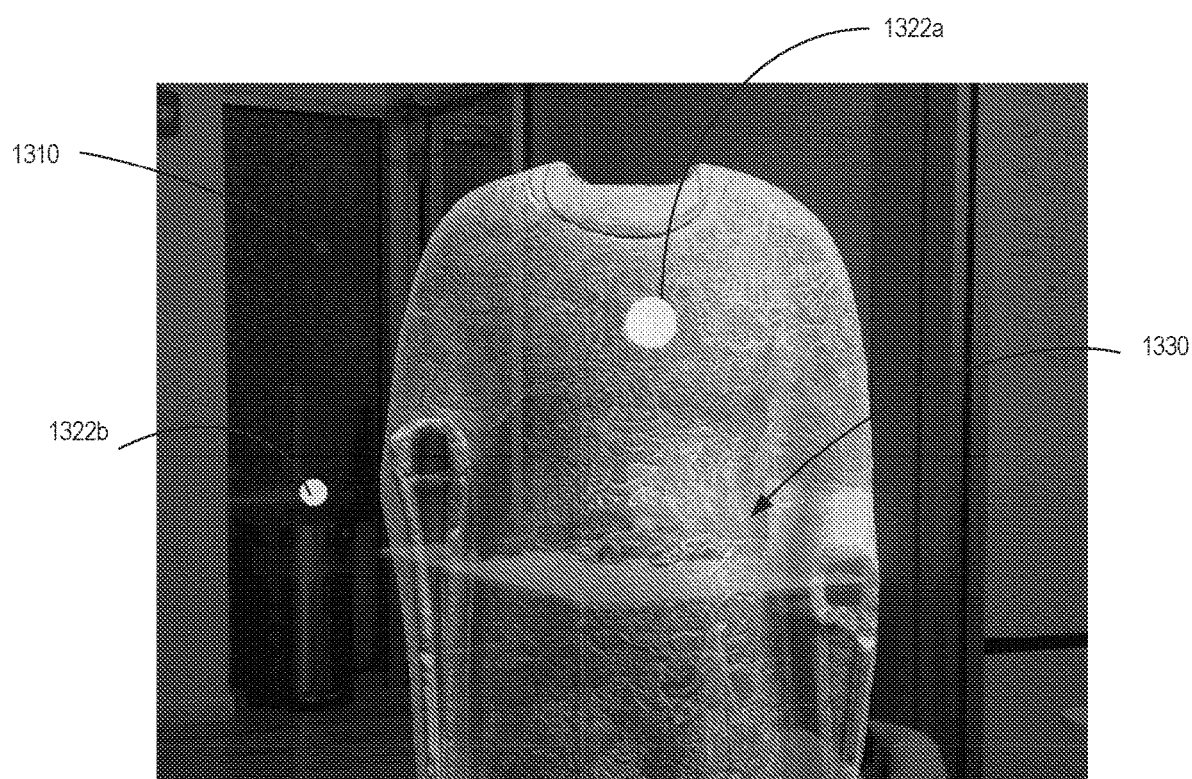

FIG. 13B illustrates a panel selection action, which allows the presenter to cause additional detail of the statue and/or external data regarding a portion of the statue to be displayed to the users. In this example, the virtual room seen by the presenter includes markers that represent different panels that can be activated for view. In the example of FIG. 13B, panel markers 1322 are visualized as white circles on areas of the statue where a panel is available. The presenter may move a pointer onto a desired marker 1322 and then press a trigger (or provide other activation command) to activate the panel. In response to selection of a panel, information associated with the panel is automatically displayed to all users, such as via an animation of the content out of the statue. Panels may comprise any type of content, such as animations, sounds, vignettes, models, etc. In the example of FIG. 13B, a panel 1330 has been activated by selection of panel marker 1322a, and is viewable by all of the users in the room (e.g., a presenter and multiple participants and/or spectators). In this example, a blue emission marker extends from the selected panel marker 1322a towards the panel 1330 to illustrate the association between the selected panel marker and panel.

Figure 13C:
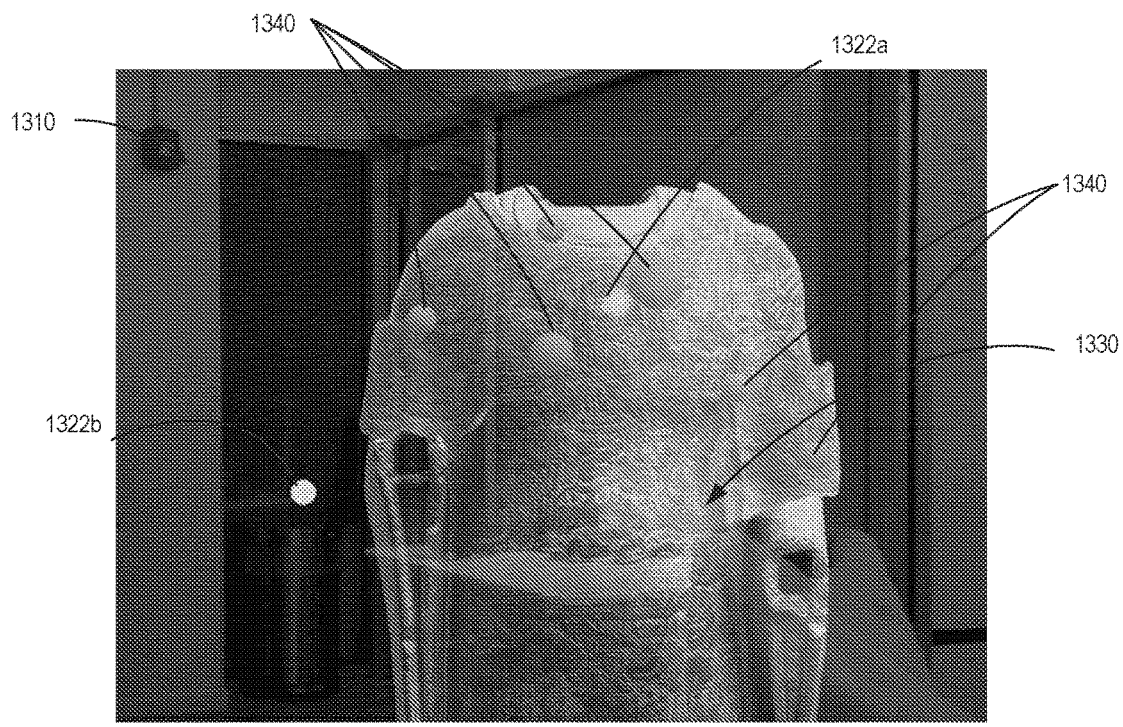

FIG. 13C illustrates the panel 1330 and several associated emission markers 1340, each associated with different portions of content of the panel 1330. In some implementations, the emission markers 1340 are displayed immediately upon selection of the panel marker 1322 which may change colors or shape to indicate its selection status. In some implementations, the emission markers 1340 are associated with different vignettes that are seen across the statue 1310. The presenter may hover the pointer on top of a particular emission marker 1340 and press the trigger on a controller to select an associated vignette for display as part of panel 1330. Advantageously, as the presenter selects portions of content associated with a panel, other users in the room are concurrently provided with the same content.

Figure 13D:
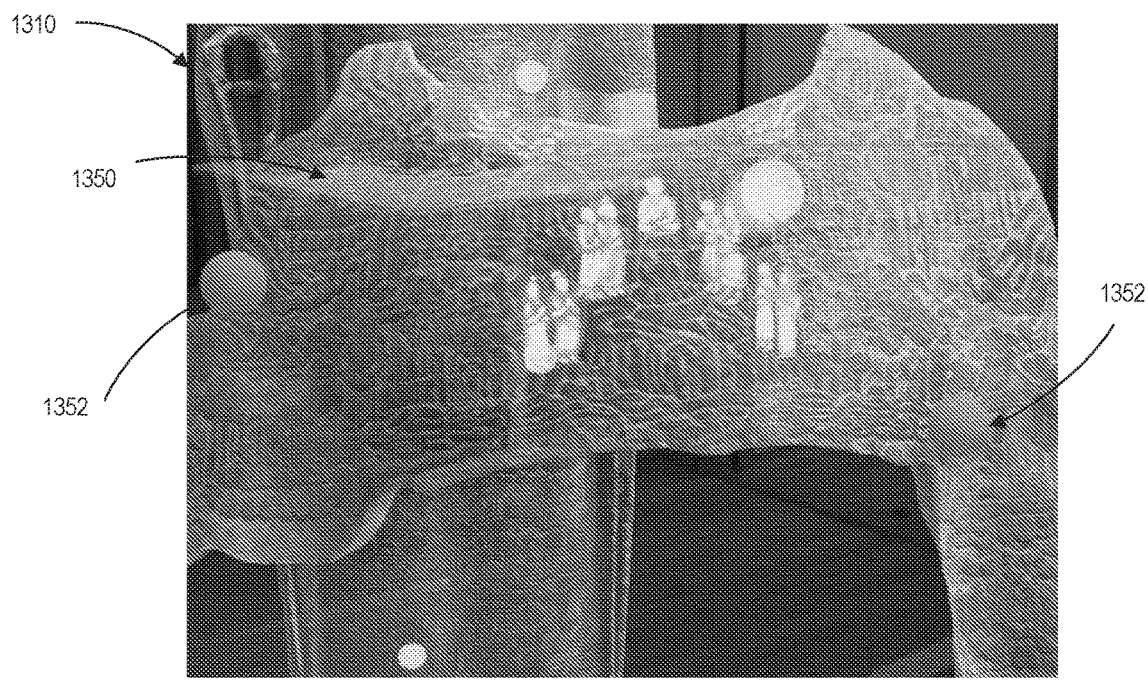

FIG. 13D illustrates another view of the statue 1310 wherein a panel 1350 is offset from the statue 1310 and emission markers 1352 are available for selection to provide additional content relevant to portions of the statue.

In some implementations, the presenter and/or one or more authorized users may suggest various display settings within the virtual room. For example, in some implementations the presenter may move a controller away from the statue and press the trigger to initiate switching between different contrast states of statue. Similarly, other controller inputs, gestures, voice commands, etc. may be used to update other visual settings.

In some implementations, users are able to leave the virtual room by pressing a home button and then selecting "leave." The virtual room may be configured so that once the presenter has left the room, all other users in the room are automatically exited from the session also.

Example Panel View Modes

Various panel view modes are available in different implementations of shared virtual rooms. These multiple panel views may reduce the friction involved with a large number of people in the same shared space viewing a piece of content at the same time. For example, with a virtual object that users will want to view up close, such as a statue that is covered with finely etched drawings depicting stories from the past, the users typically would need to walk up very closely to the panel to read them. However, this becomes very difficult in a classroom or lecture situation if students are seated and the statue is placed at the front of the room. Thus, multiple panel views may be provided to accommodate various group sizes and situations. In some implementations, the presenter is the only user who has control over selection of the panel views, while the participants may be allowed to navigate about the selected panel and/or the virtual object. Activation of a panel (or "panel activation") initiates an intermediate state that a user can put the statue into from the default or normal state to stage a panel into any of the three viewing modes. In some implementations, when a panel is activated the system executes a user view-synching routine that locates all users' headpose information and renders the panel per offset calculations and/or anchors the content to the floor in respective users' coordinate spaces.

In some embodiments, only the presenter is authorized to change the panel view, while in other embodiments certain other users (e.g., participants and/or spectators) may be authorized to perform certain view mode changes. In some implementations, participants (e.g., students), are able to hover over a "like" icon and press their controller trigger to indicate that they liked a particular portion of a presentation. For example, in some embodiments each virtual object, panel, and/or vignette may have associated participant feedback options available, such as a like or dislike button or icon that may be selected by participants and/or spectators.

Figure 14:
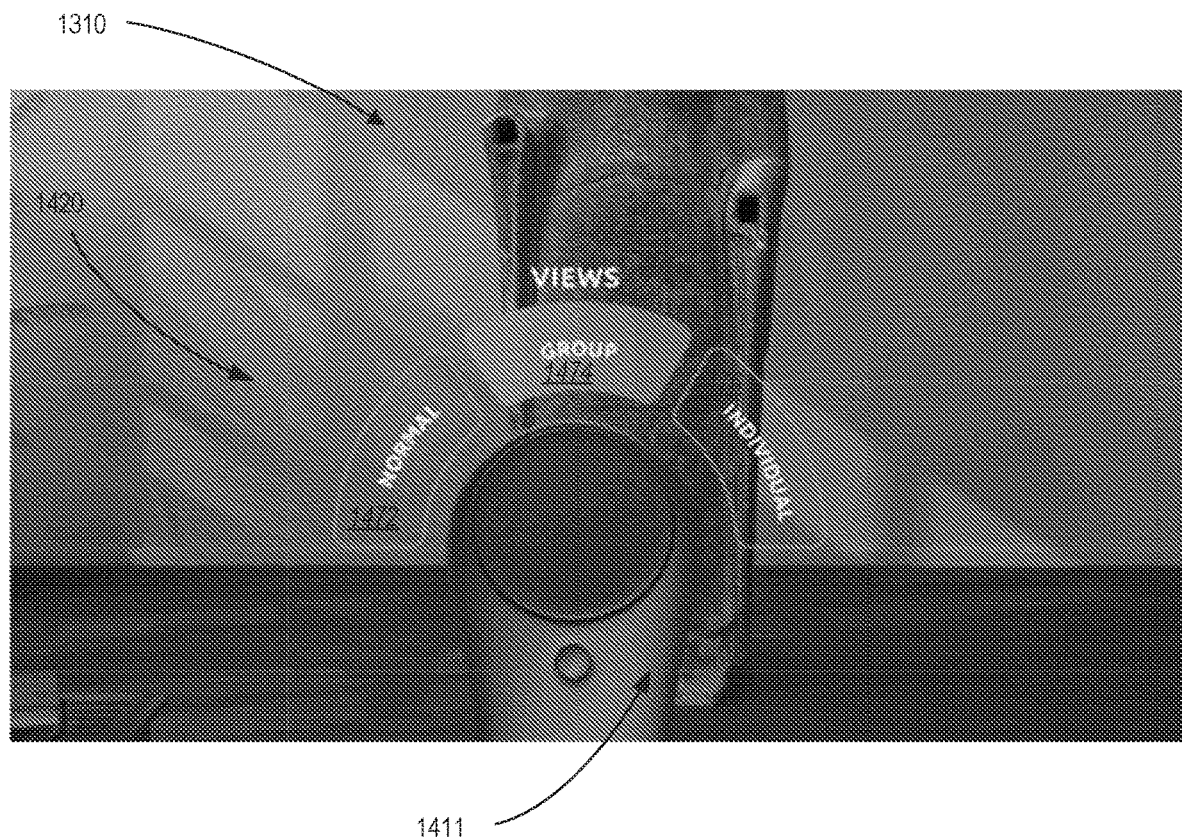
FIG. 14 illustrates an example of a controller and an associated view select menu that allows the user to select a view mode.

FIG. 14 illustrates an example of a controller 1411 and an associated view select menu 1420 that allows the user to select a view mode of a panel. Depending on the embodiment, the available views may be different and, in certain implementations certain views may be customizable. In some implementations, the views include a normal view, group view, and individual view, which are each discussed in further detail below. These views may be selected using the menu 1420, such as is illustrated in FIG. 14, to select a normal view icon 1472, group view icon 1474, or individual view icon 1476. In some implementations, a view change menu, such as menu 1420, is presented to the user in response to touching the touchpad of the controller 1411. The user may then move their thumb left or right to highlight a desired view mode and, while still touching the touchpad, press the trigger to select a desired view mode. In some implementations, with the virtual menu 1420 displayed (such as responsive to a touchpad press), pressing on a quadrant of the touchpad will bring up the closest UI option as pre-selected, and releasing the touchpad will disappear the UI menu. In some implementations, other inputs or commands may be used to switch between views, such as gestures or voice commands, for example.

A normal view mode, which may be selected using the normal view icon 1472, displays the virtual object with all panels deactivated and/or receded back into the virtual object. The normal view mode may be the default mode that is active when a viewing session is initiated, and selection of normal view mode during the session may reset the virtual object back to its original state. For example, any rotations or panel selections may be reset when the normal view mode is selected.

Figure 15A:
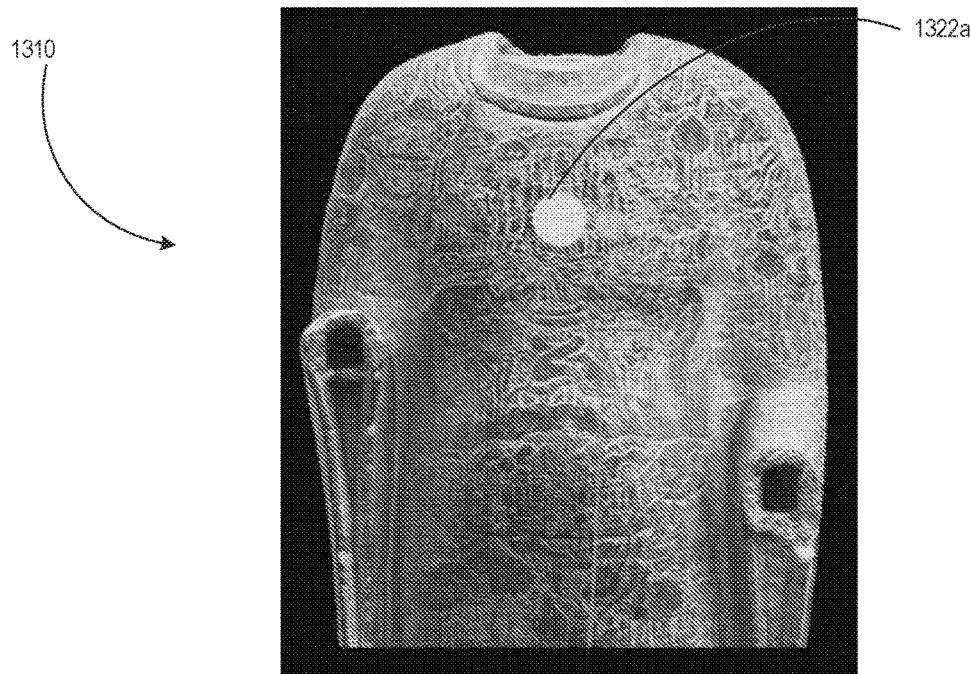
FIG. 15A illustrates a virtual object (e.g., a statue) in a normal view mode.

FIG. 15A illustrates the statue 1310 in a normal view mode. The normal view mode displays a selected panel protruded out slightly and allows the user to play the scene animation close to the body of the statue. The normal view mode may be advantageous when there is only one user (e.g., the presenter) in the session and they would like to experience the virtual content by themselves. In the example of FIG. 15A, a panel marker 1322a is shown on the statue 1310, along with a pointer 1510 that is controlled by the user (e.g., by the presenter). In the example of FIG. 15A, a panel has not yet been activated for displayed separate from the statue 1310.

Figure 15B:
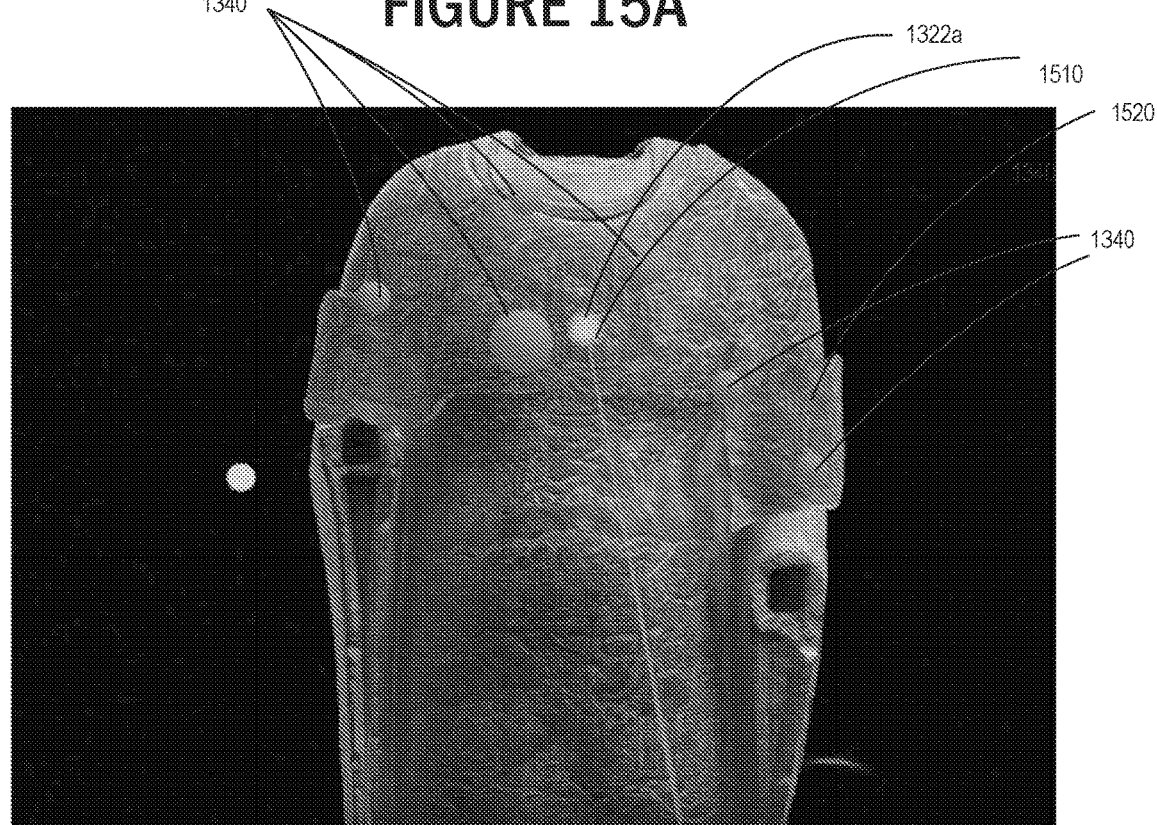
FIG. 15B illustrates the normal view mode after a panel marker has been selected, such as by the pointer being placed on the panel marker and the trigger of the controller pressed.

FIG. 15B illustrates the normal view mode after the panel marker 1322a has been selected, such as by the pointer 1510 being placed on the panel marker 1322a and the trigger of the controller pressed. Selection of the panel marker 1322a has initiated rendering of a panel 1520 that is rendered offset from the statue 1310. For example, the panel may be offset from the statue by 0.01 m on hover and 0.15 m when selected. When the panel marker 1322a is selected, multiple emission markers 1340 are also viewable, which may be selected to provide further information regarding an area of the statue associated with the respective emission marker 1340.

Figure 15C:
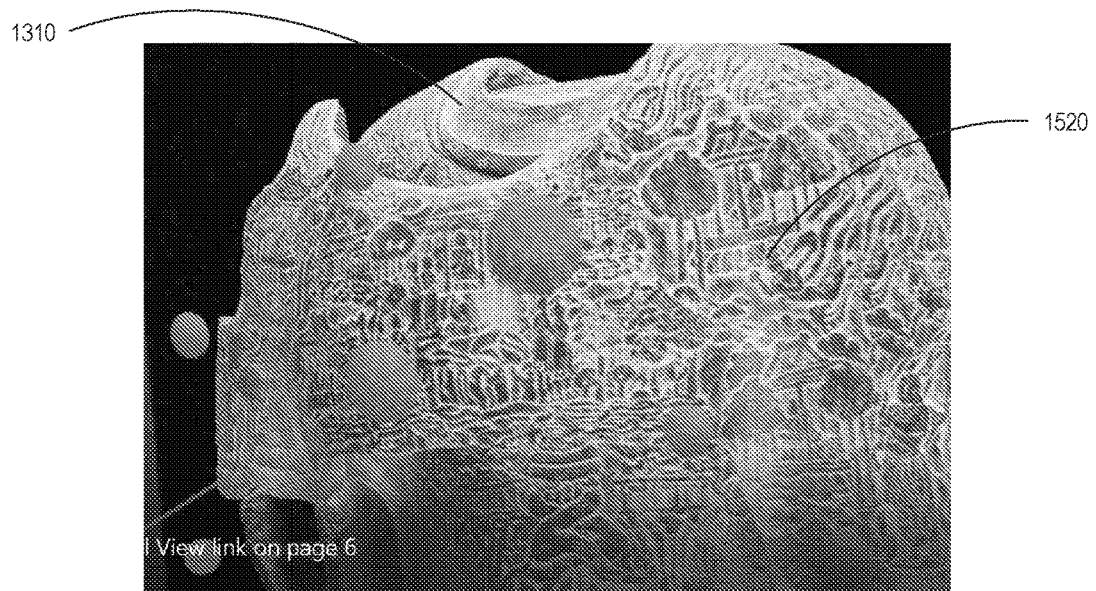
FIG. 15C illustrates a zoomed in view of a portion of the statue with the panel selected.
Figure 15D:
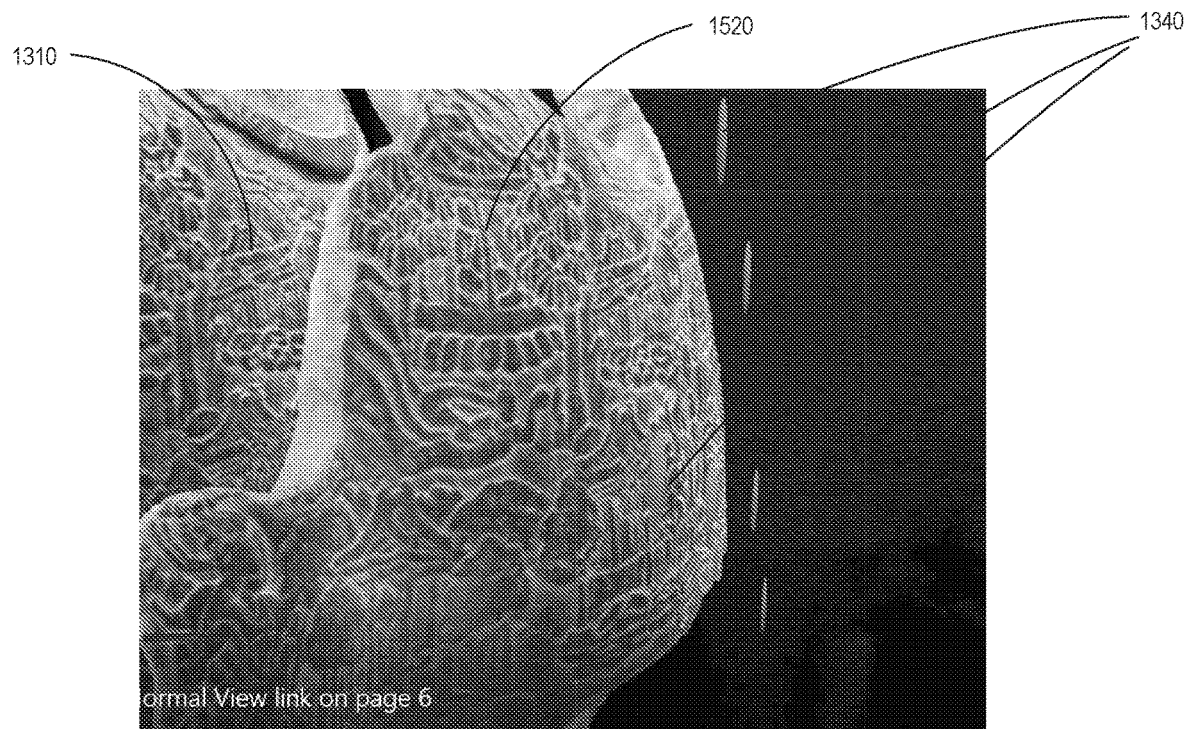
FIG. 15D shows a further zoomed in view of a substantially side view of a portion of the statute, with the panel and emission markers rotated in relation to the rotations of the statue.

FIGS. 15C and 15D illustrate different views of the statue and the emission markers 1340 that are possible via the manipulations discussed herein. FIG. 15C, for example, illustrates a zoomed in view of a portion of the statue with the panel 1520 selected (by selection of the panel marker 1322). In this implementation, the panel 1520 is duplicated and offset from the statue 1310 to allow closer inspection of features of the statue 1310. FIG. 15D shows a further zoomed in view of a substantially side view of a portion of the statue 1310, with the panel 1520 and emission markers 1340 rotated in relation to the rotations of the statue 1310. As any other manipulations of statue 1310 are performed, similar manipulations of any selected panels and associated markers may also be applied. Thus, the user is able to manipulate the virtual object without resetting panel selections or other information that may be displayed.

Figure 16:
FIG. 16 illustrates the virtual room with a group view mode selected, which may be selected using the group view icon, for example.

FIG. 16 illustrates the virtual room with a group view mode selected, which may be selected using the group view icon 1474, for example. In the group view mode, a selected panel is scaled up in size and shown above (or beside or adjacent to) the virtual object. For example, in a particular implementation, the group view scales up the panel by a value of 1.5 and renders it 1.844 m up, 0.35 forward from the center of the statue body and the panel faces in a fixed direction relative to the statue's orientation in which the user has selected. The group view mode may be optimal for a small audience, especially if the audience is in the same physical space together. The presenter may select to go into group view mode either from any view mode (e.g. normal view mode or individual view mode). In some implementations, the passable world update will allow the user who places the statue first in the same shared physical space to define the statue's initial orientation, and all other new users joining the local space will see that orientation. In some implementations, manipulations of the statue made by the presenter do not affect display of the panel. For example, the panel seen by participants may not rotate if the presenter rotates the statue. In some implementations, the system may be configured so that some or all manipulations of the statue may be performed on the panel also.

Figure 17:
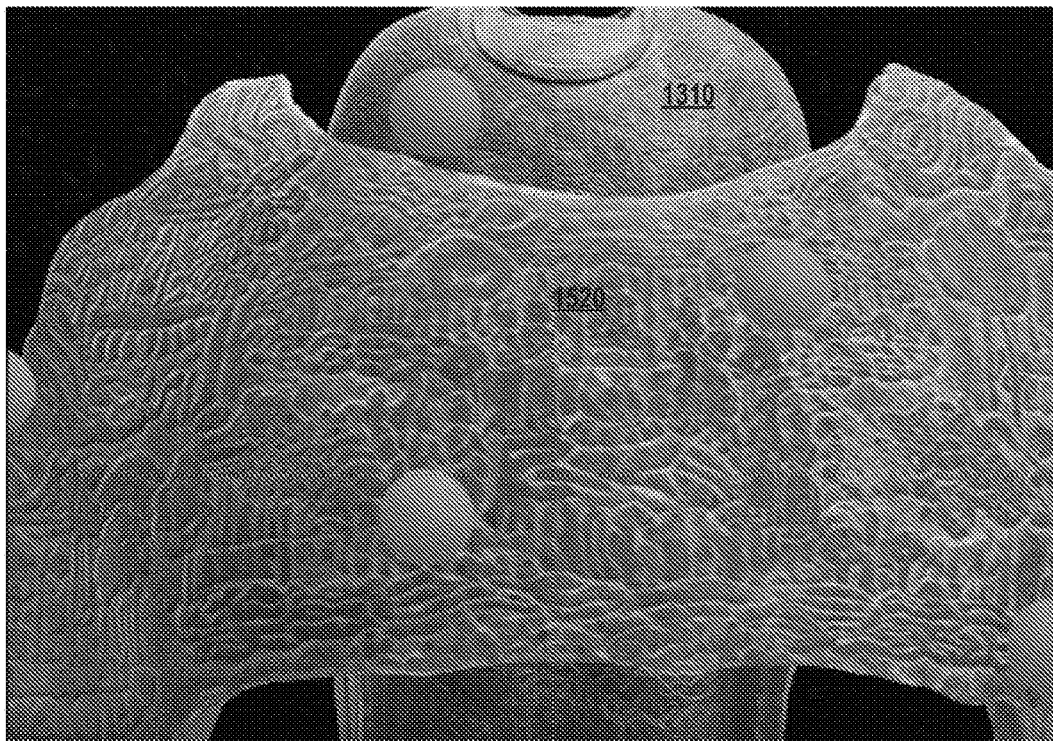
FIG. 17 illustrates the virtual room with an individual mode selected, which may be selected using the individual view icon, for example.

FIG. 17 illustrates the virtual room with an individual mode selected, which may be selected using the individual view icon 1476, for example. The individual view mode presents a close-up view of the panel 1520 in front of their individual headsets. In this mode, each of the participants may individually move about the panel 1520 to obtain different views of the panel. The presenter will also see a close up view of the panel 1520, but not the panels of the individual participants. When an emission marker is selected by the presenter, that selection will be streamed to all users in the room. Thus, the individual view teleports a panel directly in front of each student in the session, including additional content associated with the panel that is selected by the presenter. Once placed, the panel acts like a podium, where the user can walk away from it without it following the user. In some embodiments, only the user will see the user's individual panel but not the other participant's or presenter's individual panel. All users may still see shared virtual content at the same real world location (e.g. statue at the front of the room). This mode may be optimal for a large audience so the participants do not have to move or gather near the statue to see the scene animations on the panel.

In some implementations, the presenter may select to go into individual view mode either from normal view mode or from the group view mode and, similarly, may return to either of those view modes from the individual view mode. In some embodiments, any view mode may be selected from any other view mode. The individual view mode may identify all users in the session to the presenter, including self (the presenter) and renders the selected panel in front of all users. In a particular implementation, selection of the individual view mode places the panel at an offset that is relative to the current head pose of the user, such as, for example, at 0.75 m forward, 0.15 m down from the user's headpose and rotated by −20 deg pitch, 180 deg yaw. Any other suitable offset may be used. Thus, in some implementations the panel syncs to the user's view, so that once the panel locates the users' headpose information, it renders a panel per offset values and anchors the content to the coordinate space. Once anchored, the user may walk away from it and it remains there. In other implementations, other placements and characteristics of panels may be automatically applied in individual view mode. When the presenter takes the panel out of individual view mode then this information resets. In some implementations, the panel does not rotate if the presenter rotates the statue.

In some implementations, one or more classroom views are available, such as to the presenter. These classroom views allow the presenter to view and monitor how participants and/or spectators are interacting with the virtual object. The classroom views may be selectable through various inputs, such as pressing a bumper on the controller, providing a voice command, performing a particular gesture, and/or any other predetermined input.

Figure 18A:
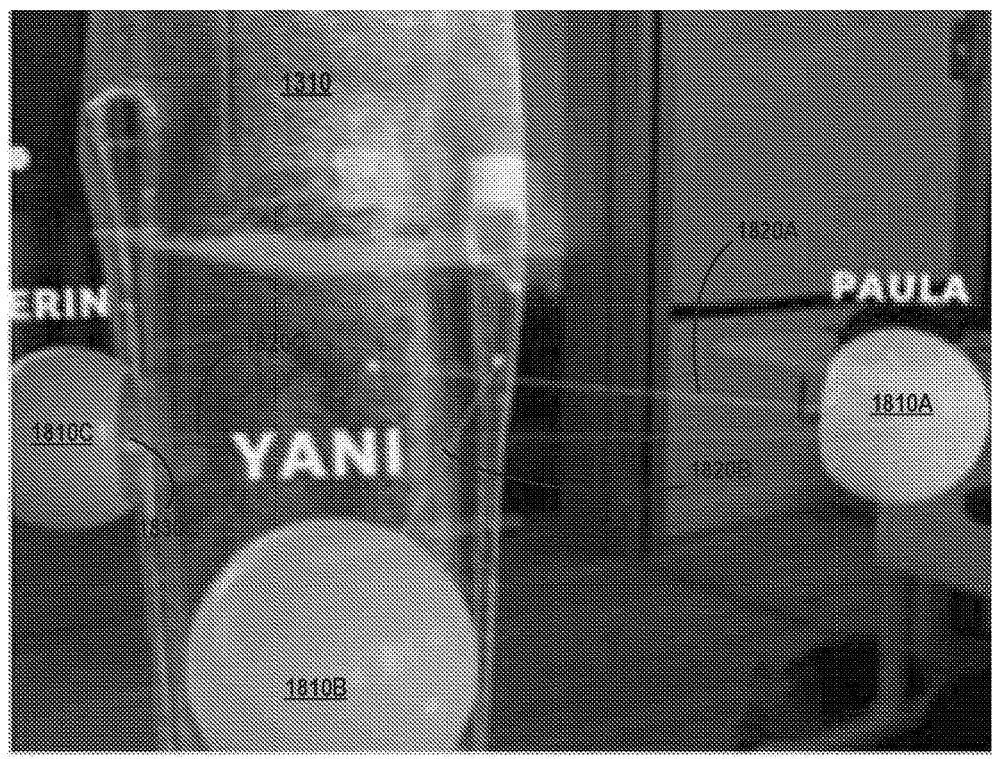
FIG. 18A illustrates a positional tracking view, which is one example of a classroom view.

FIG. 18A illustrates a positional tracking view, which is one example of a classroom view. In this view, the presenter is able to see participants as they move around the environment in real time. Thus, the position and rotation (relative to the statue or other virtual object) of the participants headset will be seen by the movements of the sphere avatars 1810 (e.g., 1810A, 1810B, 1810C). In some implementations, the positional tracking view may be modified to show a head-gaze direction of the users, which further allows the presenter to monitor what participants are viewing through a ray or line extending from the sphere avatars 1810. In the example of FIG. 18A, the head gaze view is activated such that gaze direction indicators 1820 are visible to the presenter. Thus, in the example of FIG. 18A, head gaze indicator 1820A indicates gaze direction of the user associated with sphere avatar 1810A, head gaze indicator 1820B indicates gaze direction of the user associated with sphere avatar 1810B, and head gaze indicator 1820C indicates gaze direction of the user associated with sphere avatar 1810C. In some implementations, the sphere avatars may be modified to include a gaze direction indicator 1830, as an alternative to or in addition to head gaze indicators 1820. In the example of FIG. 18A, gaze direction indicator 1830C is shown to indicate gaze direction of the user associated with sphere avatar 1810C. These gaze indicators allow the presenter (and/or other users) to identify users that may not be engaged in the presentation. In other implementations, other avatars may be used, such as custom avatars that may be chosen by the individual users or avatars of the users' heads and faces. Additionally, other indicators of gaze direction may be used in the interactive virtual environment. In some embodiments, the gaze vectors may be based on data from one or more inward-facing eye cameras (such as, for example, the inward-facing imaging system 462 of FIG. 4).

Figure 18B:
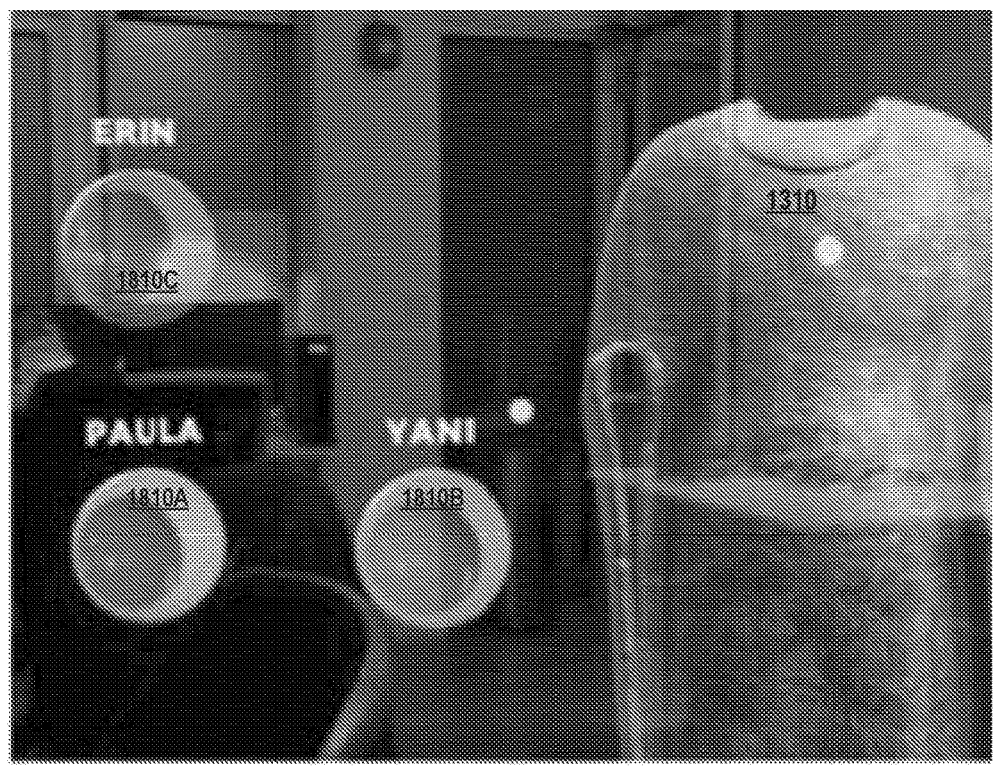
FIG. 18B illustrates a stadium view mode, which is another example of a classroom view mode.

FIG. 18B illustrates a stadium view mode, which is another example of a classroom view mode. In this view, the avatars of participants are stacked, such as in a gridlike format, for a cleaner view of the participants and the virtual room. This view may be useful when the presenter wishes to see all active participants in one consolidated location. In some embodiments, the presenter will be the only user that is able to see this view, and selection of this view will not affect the experience of participants (e.g., the participants will not know which classroom view, if any, the presenter is viewing). In the example of FIG. 18B, the icons 1810A, 1810B, 1810C of the three participants are arranged in a grid pattern, with the statue 1310 continuing to be viewable in the mixed reality environment. The stadium view mode may allow other arrangements of participant avatars, such as in a circle or semicircle around the statue 1310.

Example Systems and Methods of Operation

Figure 19:
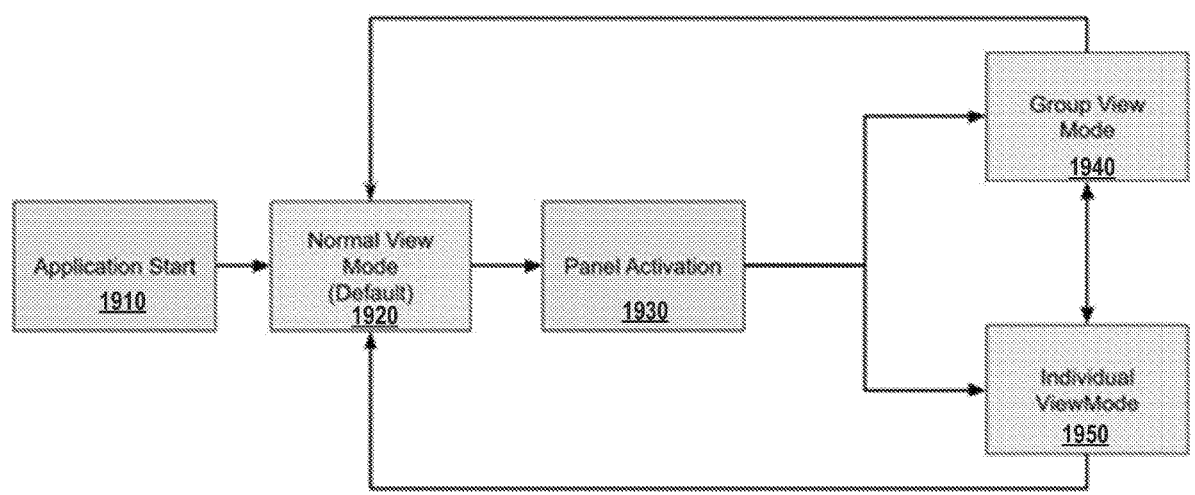
FIG. 19 is a conceptual block diagram illustrating changes between view modes within a shared viewing room.

FIG. 19 is a conceptual block diagram illustrating changes between view modes within a shared viewing room. While additional or fewer viewing modes may be possible in different implementations, FIG. 19 illustrates a normal view mode 1920, a group view mode 1940, and an individual view mode 1950. In some implementations, one or more classroom view modes are accessible from any of the view modes 1920, 1940, 1950.

With reference to the example of FIG. 19, the application starts at block 1910, such as when the presenter logs into a virtual room for a presentation. One or more participants and/or spectators may already be in the virtual room, waiting for activation of the presentation by the presenter. A normal view mode 1920 is initially used to display the same virtual object to each of the users. The presenter is then able to activate a panel 1930 in the normal view mode (e.g., see FIG. 15). With a panel activated, the presenter may activate a view select menu (e.g., menu 1420 of FIG. 14) to initiate activation of a different view mode. As shown in FIG. 19, the presenter may be able to transition to either a group view mode 1940 or to an individual view mode 1950. Once the presenter selects either of the view modes 1940 or 1950, each of the participants' displays are automatically transformed to that selected view mode. The presenter can move between view modes 1940 and 1950 using the same view select menu.

From the group view mode 1940 and the individual view mode 1950, the presenter can return to the normal view mode 1920 to reset manipulations to the virtual object and de-select the panel. From there, the presenter can select another panel and perform a similar process of transitioning between the various view modes.

Figure 20A:
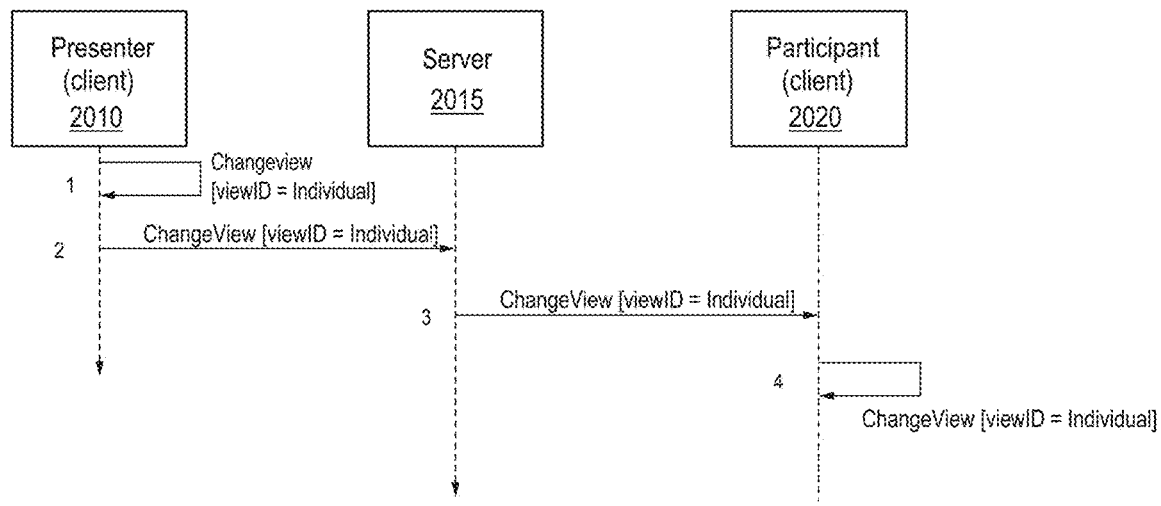
FIGS. 20A and 20B illustrate example data communication flows between a server, a presenter (e.g. a client device to the server), and a participant (e.g. another client device to the server) that may be performed in changing view modes.
Figure 20B:
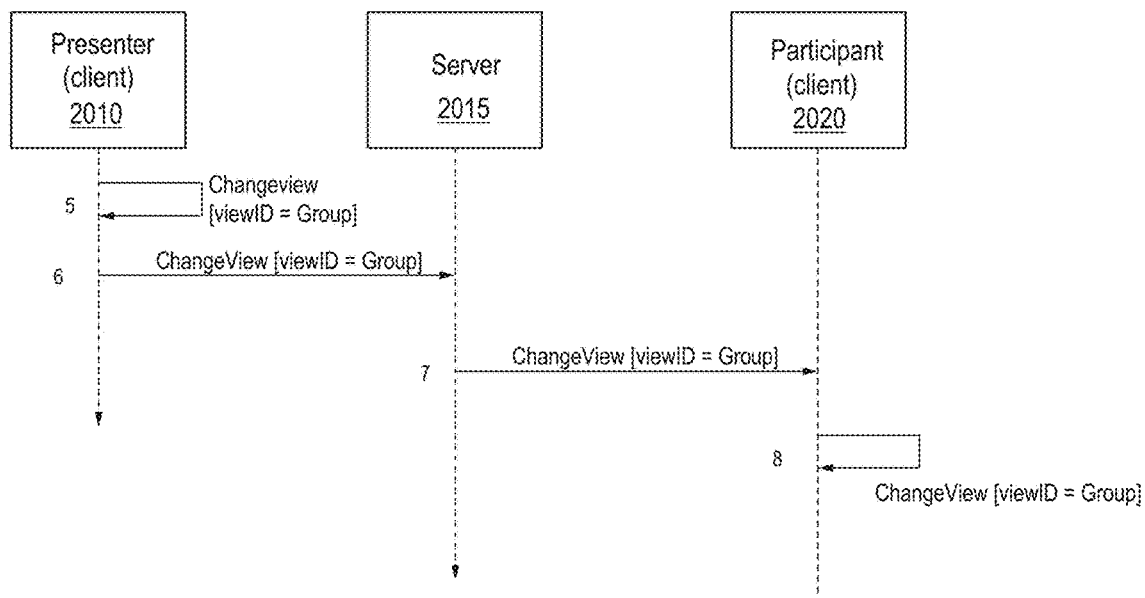

FIGS. 20A and 20B illustrate example data communication flows between a server 2015, a presenter 2010 (e.g. a client device to the server), and a participant 2020 (e.g. another client device to the server) that may be performed in changing from a normal view mode to an individual view mode (FIG. 20A) or to a group view mode (FIG. 20B). For example, in one implementation the server 2015 corresponds with the remote computing system 920 of FIG. 9A, such that the system 920 is configured to perform the functionality discussed herein with reference to the server 2015. For example, the server 2015 may operate in a cloud environment that is accessible to any internet accessible devices, such as multiple wearable devices of participants. In this example, the presenter 2010 may correspond with the user 930C (FIG. 9A) and the participant 2020 may correspond with the user 930B (FIG. 9A). In other implementations, other arrangements of computing devices and systems may be used to implement the joint viewing room operations discussed herein. Depending on the embodiment, the method of FIGS. 20A and 20B may include fewer or additional actions and the actions may be performed in an order that is different than illustrated. For example, in some implementations certain actions may not be performed.

With reference to FIG. 20A, with the viewing room in a normal view mode (or group view mode), at action 1 the presenter's input to switch to individual view mode is entered client side and the client device 2010 sends a "Changeview [viewID=Individual]" message to itself. For example, the information may indicate where to render the panel so that it is positioned relative to the user's current headpose. For example, the position of the panel may be set to a fixed offset forward (e.g., 0.5 m, 0.75 m, 1.0 m, 1.5 m, etc.) and a fixed offset down (e.g., 0.15 m, 0.3 m, etc.) from the user's headpose. In some implementations, the information may also indicate panel rotation parameters, such as to rotate the panel (e.g., by −30 deg, −20 deg, −10 deg, etc.) and adjust the yaw (e.g., by 155 deg, 180 deg, 215 deg, etc.).

Next, at action 2, an "IndividualViewChanged" message is transmitted to the server 2015 to indicate that the presenter has changed the view mode to Individual. Next, at action 3, the server 2015 transmits a "Changeview [viewID=Individual]" message to the participant (client) 2020. At action 4, the participant (client) device 2020 receives the server message and sends a "Changeview [viewID=Individual]" message to itself to initiate the change to the individual view mode. The view change message (e.g., Changeview [viewID=Individual]), which indicates detailed individual view information (e.g., to position the panel for the participants based on the current headpose of the participant) may be identical to the view change message used by the presenter (client) 2010 at action 1 and 2, above. Alternatively, in some implementations the individual view information may be different for the presenter 2010 and the participant 2020.

With reference to FIG. 20B, with the viewing room in a normal view mode (or individual view mode), at action 5 the presenter's input to switch to group view mode is entered client side and the client device 2010 sends a "Changeview [viewID=Group]" message to itself. For example, information to scale up the selected panel by a predetermined amount (e.g., by 150%, 200%, 300%, etc.) to render the panel a predetermined distance above the virtual object (e.g., 1 m, 1.844 m, 2 m, 3 m, 4 m, etc.), and/or a predetermined distance forward of the virtual object (e.g., 0.1 m, 0.2 m, 0.3 m, 0.35 m, 0.5 m, 1.0 m, etc.) forward from a center of the virtual object (e.g., from the chest of a statue body) is processed by the client device 2010.

Next, at action 6, a "GroupViewChanged" message is transmitted to the server 2015 to indicate that the presenter has changed the view mode to Group. Next, at action 7, the server 2015 transmits a "Changeview [viewID=Group]" message to the participant (client) 2020. At 8, the participant (client) device 2020 receives the server message and sends a "Changeview [viewID=Group]" message to itself to initiate the change to the group view mode. The view change message (e.g., Changeview [viewID=Group]), which indicates detailed group view information (e.g., to scale the panel, position to render the panel above the virtual object, and/or offset distance from the virtual object) may be identical to the group view information used by the presenter (client) 2010 at action 5 and 6, above. Alternatively, in some implementations the group view information may be different for the presenter 2010 and the participant 2020.

In some implementations, panel views may not directly use passable world data and may only rely on the user's headpose information. In such implementations, passable world data may only be used at the start of the application when user places the virtual object (e.g. the statue) in their space.

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including determining a plurality of wearable systems associated with a virtual environment including a virtual object, the plurality of wearable systems including a first wearable system authorized to update views of other wearable systems. The method may also include where the first wearable system depicts to a presenter a view of the virtual object that includes a panel selection area associated with a panel of multimedia content regarding the virtual object, where selection of the panel selection area by the presenter causes display of the panel at a first location with reference to the virtual object. The method may also include detecting a view change input from the first wearable system. The method may also include in response to determining that the view change input indicates an individual view mode, transmitting instructions to each of the wearable systems associated with the viewing environment to update output of the wearable system to display the panel at a second location relative to a current head pose of the user of the wearable system. The method may also include in response to determining that the view change input indicates a group view mode, transmitting instructions to each of the wearable systems associated with the viewing environment to update output of the wearable system to display the panel at a third location with reference to the virtual object. Other embodiments of this aspect include corresponding computer systems, apparatus, and computer programs recorded on one or more computer storage devices, each configured to perform the actions of the methods.

Implementations may include one or more of the following features. The method where voice input on the first wearable system is broadcast to each of the plurality of wearable systems. The method further including: in response to rotation of the virtual object by the presenter, automatically initiating rotation of the virtual object in display of the plurality of wearable systems. The method further including: in response to determining that the view change input indicates a classroom view mode, updating the viewing environment of the first wearable system to include a plurality of avatars associated with the plurality of wearable systems. The method where locations of the plurality of avatars in the virtual environment are updated in real-time so the presenter views movements of users of the wearable systems. The method where the plurality of avatars are arranged in a pattern in the virtual environment viewable by the presenter. The method where a gaze direction of the avatars is visually indicated in the viewing environment of the presenter. The method where the gaze direction is visually indicated with a marking on the avatar. The method where the gaze direction is visually indicated with a line extending outward from the avatar in the determined gaze direction. The method further including: presenting a view menu to the presenter via the first wearable system, the view menu including selectable options associated with a view change input. The method where the panel includes one or more emission markers associated with respective content. The method where the emission markers are visible as colored circles. The method where the first wearable system is configured to allow the presenter to provide inputs to cause the virtual object to rotate. The method where the first location with reference to the virtual object is offset away from the virtual object by a first distance. The method where the panel is enlarged in the group view mode. The method where the third location with reference to the virtual object is offset away from the virtual object a second distance that is greater than the first distance. The method where the third location is above the virtual object. The method where each wearable system that is in the individual view mode displays an individual view of the panel that is viewable only by the individual user. The method where the first wearable system is coupled to a handheld controller configured to interact with the first user to receive the view change input from the first user. Implementations of the described techniques may include hardware, a method or process, or computer software on a computer-accessible medium.

One general aspect includes a method that determines a plurality of wearable systems associated with a virtual scene including a virtual object, where each of the wearable systems depict to respective users of the wearable systems (i) a shared portion of a virtual scene associated with the virtual object that is the same for each wearable system and (ii) an individual portion of the virtual scene associated with the virtual object that is customizable by the individual users. The method may also include where at least one of the wearable systems is configured to receive inputs to change a view mode of the virtual scene, where the view modes define which portions of the virtual scene are included in each of the shared and individual portions. The method may also include electronically communicating with each of the wearable systems virtual scene information in accordance with a currently selected view mode. Other embodiments of this aspect include corresponding computer systems, apparatus, and computer programs recorded on one or more computer storage devices, each configured to perform the actions of the methods.

Implementations may include one or more of the following features. The method where the view modes include at least: a first view mode that displays a detail view of information associated with the virtual object at a first location relative to a current head pose of the user of the wearable system; and a second view mode that displays the detail view at a second location with reference to the virtual object. The method where the detail view is displayed in response to selection of a detail view selection item displayed on the virtual object. The method where the detail view is displayed in response to selection of a detail view selection item displayed on the virtual object. The method where a second detail view of second information associated with the virtual object is displayed in response to selection of a second detail view selection item displayed on the virtual object. The method where the detail view is no longer displayed when the second detail view is selected for display. The method where the detail view includes a panel.

The method where the detail view is included in the individual portion of the virtual scene and is customizable by the individual users. The method where in the group view mode the detail view is included in the shared portion of the virtual scene and is the same for each wearable system. The method where the shared portion of the virtual scene is at a fixed real world location for all users and the individual portion of the virtual scene is positioned relative to each individual user at the corresponding different real world locations of the users. The method where each wearable system is configured to allow the user to virtually move in the shared portion of the virtual scene without affecting movement of other users within the virtual scene. The method where the individual portion of the virtual scene is visible and manipulatable by only the user of the particular wearable system. The method where the at least one of the wearable systems is configured to manipulate the virtual object such that the manipulations of the virtual object are displayed by each of the wearable systems. The method where each of the wearable systems is configured to provide respective users with at least a partial view of a real-world environment of the user in combination with the virtual scene. Implementations of the described techniques may include hardware, a method or process, or computer software on a computer-accessible medium.

ADDITIONAL CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some implementations, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example implementations. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every implementation.

Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computer-implemented method performed by one or more hardware computer processors of a computing system, the method comprising:
   determining a plurality of wearable systems associated with a virtual scene that includes a virtual object, wherein each of the wearable systems concurrently presents: (i) a shared portion of the virtual scene that is the same for each wearable system, and (ii) an individual portion of the virtual scene that is customizable by a user of the respective wearable system;
   receiving an indication of a view change input that is received by a first wearable system of the plurality of wearable systems, the view change input indicating a selected view mode of the virtual scene that is being presented through the first wearable system, wherein the selected view mode is selected from a plurality of available view modes that define which portions of the virtual scene are included in one or more of the shared portion and the individual portions; and
   in response to the indication of the view change input received by the first wearable system, communicating virtual scene information to each of the plurality wearable systems, wherein the virtual scene information causes each of the plurality of wearable systems to present at least one of the shared portion or the respective individual portion of the virtual scene according to the selected view mode.

2. The method of claim 1, wherein the shared portion of the virtual scene includes a detail view including detailed information regarding the virtual object.

3. The method of claim 2, wherein the detail view is presented, through each of the plurality of wearable systems, at a fixed real world location with respect to the virtual object.

4. The method of claim 2, wherein the detail view is presented, through each of the plurality of wearable systems, at a location that corresponds to a gaze direction of a respective user of each of the plurality of wearable systems.

5. The method of claim 1, wherein the selected view mode is selected through a view select menu that is presented by the first wearable system.

6. The method of claim 5, wherein the first wearable system includes a hardware controller, and wherein a user of the first wearable system uses the hardware controller to select the selected view mode through the view select menu.

7. The method of claim 1, wherein the selected view mode indicates that a user of the first wearable system is permitted to rotate the virtual object presented in the shared portion and that other users of the other wearable systems are not permitted to rotate the virtual object.

8. A computing system comprising:
   one or more hardware computer processors;
   non-transitory computer readable storage media storing instructions which, when executed, cause the one or more hardware computer processors to perform operations comprising:
      determining a plurality of wearable systems associated with a virtual scene that includes a virtual object, wherein each of the wearable systems concurrently presents: (i) a shared portion of the virtual scene that is the same for each wearable system, and (ii) an individual portion of the virtual scene that is customizable by a user of the respective wearable system;
      receiving an indication of a view change input that is received by a first wearable system of the plurality of wearable systems, the view change input indicating a selected view mode of the virtual scene that is being presented through the first wearable system, wherein the selected view mode is selected from a plurality of available view modes that define which portions of the virtual scene are included in one or more of the shared portion and the individual portions; and in response to the indication of the view change input received by the first wearable system, communicating virtual scene information to each of the plurality wearable systems, wherein the virtual scene information causes each of the plurality of wearable systems to present at least one of the shared portion or the respective individual portion of the virtual scene according to the selected view mode.

9. The system of claim 8, wherein the shared portion of the virtual scene includes a detail view including detailed information regarding the virtual object.

10. The system of claim 9, wherein the detail view is presented, through each of the plurality of wearable systems, at a fixed real world location with respect to the virtual object.

11. The system of claim 9, wherein the detail view is presented, through each of the plurality of wearable systems, at a location that corresponds to a gaze direction of a respective user of each of the plurality of wearable systems.

12. The system of claim 8, wherein the selected view mode is selected through a view select menu that is presented by the first wearable system.

13. The system of claim 12, wherein the first wearable system includes a hardware controller, and wherein a user of the first wearable system uses the hardware controller to select the selected view mode through the view select menu.

14. The system of claim 8, wherein the selected view mode indicates that a user of the first wearable system is permitted to rotate the virtual object presented in the shared portion and that other users of the other wearable systems are not permitted to rotate the virtual object.

15. The system of claim 8, wherein the computing system is the first wearable system.

16. One or more non-transitory computer-readable storage media storing instructions which, when executed, cause one or more hardware computer processors to perform operations comprising:

determining a plurality of wearable systems associated with a virtual scene that includes a virtual object, wherein each of the wearable systems concurrently presents: (i) a shared portion of the virtual scene that is the same for each wearable system, and (ii) an individual portion of the virtual scene that is customizable by a user of the respective wearable system;

receiving an indication of a view change input that is received by a first wearable system of the plurality of wearable systems, the view change input indicating a selected view mode of the virtual scene that is being presented through the first wearable system, wherein the selected view mode is selected from a plurality of available view modes that define which portions of the virtual scene are included in one or more of the shared portion and the individual portions; and in response to the indication of the view change input received by the first wearable system, communicating virtual scene information to each of the plurality wearable systems, wherein the virtual scene information causes each of the plurality of wearable systems to present at least one of the shared portion or the respective individual portion of the virtual scene according to the selected view mode.

17. The one or more non-transitory computer-readable storage media of claim 16, wherein the shared portion of the virtual scene includes a detail view including detailed information regarding the virtual object.

18. The one or more non-transitory computer-readable storage media of claim 17, wherein the detail view is presented, through each of the plurality of wearable systems, at a fixed real world location with respect to the virtual object.

19. The one or more non-transitory computer-readable storage media of claim 17, wherein the detail view is presented, through each of the plurality of wearable systems, at a location that corresponds to a gaze direction of a respective user of each of the plurality of wearable systems.

20. The one or more non-transitory computer-readable storage media of claim 16, wherein the selected view mode is selected through a view select menu that is presented by the first wearable system.

\* \* \* \* \*